(12) United States Patent
Liu et al.

(10) Patent No.: US 11,863,885 B2
(45) Date of Patent: *Jan. 2, 2024

(54) TIME DELAY INTEGRATION SENSOR WITH MULTIPLE SENSOR ARRAYS

(71) Applicant: PixArt Imaging Inc., Hsin-Chu County (TW)

(72) Inventors: Ren-Chieh Liu, Hsin-Chu County (TW); Chao-Chi Lee, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 34 days.

This patent is subject to a terminal disclaimer.

(21) Appl. No.: 17/711,079

(22) Filed: Apr. 1, 2022

(65) Prior Publication Data

US 2022/0224848 A1 Jul. 14, 2022

Related U.S. Application Data

(63) Continuation-in-part of application No. 17/351,235, filed on Jun. 18, 2021, now Pat. No. 11,336,843.

(30) Foreign Application Priority Data

Jun. 30, 2020 (TW) ................................. 109122077
Mar. 31, 2021 (TW) ................................. 110111970

(51) Int. Cl.
*H04N 25/531* (2023.01)
*H04N 25/771* (2023.01)
*H04N 25/772* (2023.01)

(52) U.S. Cl.
CPC ......... *H04N 25/531* (2023.01); *H04N 25/771* (2023.01); *H04N 25/772* (2023.01)

(58) Field of Classification Search
CPC ............. H04N 5/3532; H04N 5/37452; H04N 5/37455; H04N 5/3743; H04N 5/378; H04N 25/711
USPC ......................................................... 348/296
See application file for complete search history.

(56) References Cited

U.S. PATENT DOCUMENTS

| | | | | |
|---|---|---|---|---|
| 2008/0079830 A1* | 4/2008 | Lepage | ................ | H04N 25/768 |
| | | | | 348/E5.091 |
| 2011/0279725 A1* | 11/2011 | Cazaux | ................ | H04N 25/768 |
| | | | | 348/308 |
| 2014/0085518 A1* | 3/2014 | Fox | ........................ | H04N 25/75 |
| | | | | 348/E5.091 |

(Continued)

*Primary Examiner* — Lin Ye
*Assistant Examiner* — Chan T Nguyen
(74) *Attorney, Agent, or Firm* — WPAT, P.C.

(57) ABSTRACT

The present disclosure provides a time delay integration (TDI) sensor using a rolling shutter. The TDI sensor includes two pixel arrays each having multiple pixel columns. Each pixel column includes multiple pixels arranged in an along-track direction, wherein two adjacent pixels or two adjacent pixel groups in every pixel column have a separation space therebetween. The separation space is equal to a pixel height multiplied by a time ratio of a line time difference of the rolling shutter and a frame period, or equal to a summation of at least one pixel height and a multiplication of the pixel height by a time ratio of the line time difference and the frame period. The TDI sensor doubles a number of times of integrating pixel data corresponding to the same position of a scene by arranging two separately operated pixel arrays.

20 Claims, 20 Drawing Sheets

(56) References Cited

U.S. PATENT DOCUMENTS

2018/0098014 A1* 4/2018 Zuleta .................. H04N 25/135
2019/0132541 A1* 5/2019 Borremans .......... H04N 25/711

* cited by examiner

*one line time difference

| Frame No. | Frame1 | Frame2 | Frame3 | Frame4 | Frame5 | Frame6 | Frame7 | Frame8 | Frame9 | Frame10 | ... | ... | ... |
|---|---|---|---|---|---|---|---|---|---|---|---|---|---|
| Integrator 73 | $1 1_A$ | $1 1_B$ | $1 1_C$ | $1 1_D$ | $1 1_E$ | $1 1_F$ | $1 1_G$ | $1 1_H$ | $1 1_I$ | $1 1_J$ | ... | ... | ... |
| Integrator 72 | 0 | $2 1_A$ | $2 1_B$ | $2 1_C$ | $2 1_D$ | $2 1_E$ | $2 1_F$ | $2 1_G$ | $2 1_H$ | $2 1_I$ | ... | ... | ... |
| Integrator 71 | 0 | 0 | $3 1_A$ | $3 1_B$ | $3 1_C$ | $3 1_D$ | $3 1_E$ | $3 1_F$ | $3 1_G$ | $3 1_H$ | ... | ... | ... |
| Output | | | $3 1_A$ | $3 1_B$ | $3 1_C$ | $3 1_D$ | $3 1_E$ | $3 1_F$ | $3 1_G$ | $3 1_H$ | ... | $3 1_I$ | $3 1_J$ |

*double line time difference

| Frame No. | Frame1 | Frame2 | Frame3 | Frame4 | Frame5 | Frame6 | Frame7 | Frame8 | Frame9 | Frame10 | ... | ... | ... |
|---|---|---|---|---|---|---|---|---|---|---|---|---|---|
| Integrator 73 | $1 1_A$ | $1 1_B$ | $1 1_C$ | $1 1_D$ | $1 1_E$ | $1 1_F$ | $1 1_G$ | $1 1_H$ | $1 1_I$ | $1 1_J$ | ... | ... | ... |
| Integrator 72 | 0 | $1 1_A$ | $1 1_B$ | $1 1_C$ | $1 1_D$ | $1 1_E$ | $1 1_F$ | $1 1_G$ | $1 1_H$ | $1 1_I$ | ... | ... | ... |
| Integrator 71 | 0 | 0 | $2 1_A$ | $2 1_B$ | $2 1_C$ | $2 1_D$ | $2 1_E$ | $2 1_F$ | $2 1_G$ | $2 1_H$ | ... | ... | ... |
| Output | | | $2 1_A$ | $2 1_B$ | $2 1_C$ | $2 1_D$ | $2 1_E$ | $2 1_F$ | $2 1_G$ | $2 1_H$ | ... | $2 1_I$ | $2 1_J$ |

FIG. 7C

*one line time difference

| Frame No. | Frame1 | Frame2 | Frame3 | Frame4 | Frame5 | Frame6 | Frame7 | Frame8 | Frame9 | Frame10 | ... | ... | ... |
|---|---|---|---|---|---|---|---|---|---|---|---|---|---|
| Integrator 84 | $1\,1_A$ | $1\,1_B$ | $1\,1_C$ | $1\,1_D$ | $1\,1_E$ | $1\,1_F$ | $1\,1_G$ | $1\,1_H$ | $1\,1_I$ | $1\,1_J$ | ... | ... | ... |
| Integrator 83 | 0 | $2\,1_A$ | $2\,1_B$ | $2\,1_C$ | $2\,1_D$ | $2\,1_E$ | $2\,1_F$ | $2\,1_G$ | $2\,1_H$ | $2\,1_I$ | ... | ... | ... |
| Integrator 82 | 0 | 0 | $3\,1_A$ | $3\,1_B$ | $3\,1_C$ | $3\,1_D$ | $3\,1_E$ | $3\,1_F$ | $3\,1_G$ | $3\,1_H$ | ... | ... | ... |
| Integrator 81 | 0 | 0 | 0 | $4\,1_A$ | $4\,1_B$ | $4\,1_C$ | $4\,1_D$ | $4\,1_E$ | $4\,1_F$ | $4\,1_G$ | ... | ... | ... |
| Output | | | | $4\,1_A$ | $4\,1_B$ | $4\,1_C$ | $4\,1_D$ | $4\,1_E$ | $4\,1_F$ | $4\,1_G$ | $4\,1_H$ | $4\,1_I$ | $4\,1_J$ |

*double line time difference

| Frame No. | Frame1 | Frame2 | Frame3 | Frame4 | Frame5 | Frame6 | Frame7 | Frame8 | Frame9 | Frame10 | ... | ... | ... |
|---|---|---|---|---|---|---|---|---|---|---|---|---|---|
| Integrator 84 | $1\,1_A$ | $1\,1_B$ | $1\,1_C$ | $1\,1_D$ | $1\,1_E$ | $1\,1_F$ | $1\,1_G$ | $1\,1_H$ | $1\,1_I$ | $1\,1_J$ | ... | ... | ... |
| Integrator 83 | 0 | $1\,1_A$ | $1\,1_B$ | $1\,1_C$ | $1\,1_D$ | $1\,1_E$ | $1\,1_F$ | $1\,1_G$ | $1\,1_H$ | $1\,1_I$ | ... | ... | ... |
| Integrator 82 | 0 | 0 | $2\,1_A$ | $2\,1_B$ | $2\,1_C$ | $2\,1_D$ | $2\,1_E$ | $2\,1_F$ | $2\,1_G$ | $2\,1_H$ | ... | ... | ... |
| Integrator 81 | 0 | 0 | 0 | 0 | 0 | 0 | 0 | 0 | 0 | 0 | ... | ... | ... |
| Output | | | $2\,1_A$ | $2\,1_B$ | $2\,1_C$ | $2\,1_D$ | $2\,1_E$ | $2\,1_F$ | $2\,1_G$ | $2\,1_H$ | $2\,1_I$ | $2\,1_J$ | |

*one line time difference

| Frame No. | Frame1 | Frame2 | Frame3 | Frame4 | Frame5 | Frame6 | Frame7 | Frame8 | Frame9 | Frame10 | ... | ... | ... |
|---|---|---|---|---|---|---|---|---|---|---|---|---|---|
| Integrator 98 | $1I_F$ | $1I_G$ | $1I_H$ | $1I_I$ | $1I_J$ | $1I_K$ | $1I_L$ | $1I_M$ | $1I_N$ | $1I_O$ | ... | ... | ... |
| Integrator 97 | $1I_E$ | $2I_F$ | $2I_G$ | $2I_H$ | $2I_I$ | $2I_J$ | $2I_K$ | $2I_L$ | $2I_M$ | $2I_N$ | ... | ... | ... |
| Integrator 96 | $1I_D$ | $2I_E$ | $3I_F$ | $3I_G$ | $3I_H$ | $3I_I$ | $3I_J$ | $3I_K$ | $3I_L$ | $3I_M$ | ... | ... | ... |
| Integrator 95 | $1I_C$ | $2I_D$ | $3I_E$ | $4I_F$ | $4I_G$ | $4I_H$ | $4I_I$ | $4I_J$ | $4I_K$ | $4I_L$ | ... | ... | ... |
| Integrator 94 | $1I_B$ | $2I_C$ | $3I_D$ | $4I_E$ | $5I_F$ | $5I_G$ | $5I_H$ | $5I_I$ | $5I_J$ | $5I_K$ | ... | ... | ... |
| Integrator 93 | $1I_A$ | $2I_B$ | $3I_C$ | $4I_D$ | $5I_E$ | $6I_F$ | $6I_G$ | $6I_H$ | $6I_I$ | $6I_J$ | ... | ... | ... |
| Integrator 92 | 0 | $2I_A$ | $3I_B$ | $4I_C$ | $5I_D$ | $6I_E$ | $7I_F$ | $7I_G$ | $7I_H$ | $7I_I$ | ... | ... | ... |
| Integrator 91 | 0 | 0 | $3I_A$ | $4I_B$ | $5I_C$ | $6I_D$ | $7I_E$ | $8I_F$ | $8I_G$ | $8I_H$ | ... | ... | ... |
| Output | | | | | | | | $8I_F$ | $8I_G$ | $8I_H$ | ... | $8I_I$ | $8I_J$ |

*double line time difference

| Frame No. | Frame1 | Frame2 | Frame3 | Frame4 | Frame5 | Frame6 | Frame7 | Frame8 | Frame9 | Frame10 | ... | ... | ... |
|---|---|---|---|---|---|---|---|---|---|---|---|---|---|
| Integrator 98 | $1I_F$ | $1I_G$ | $1I_H$ | $1I_I$ | $1I_J$ | $1I_K$ | $1I_L$ | $1I_M$ | $1I_N$ | $1I_O$ | ... | ... | ... |
| Integrator 97 | $1I_E$ | $2I_F$ | $2I_G$ | $2I_H$ | $2I_I$ | $2I_J$ | $2I_K$ | $2I_L$ | $2I_M$ | $2I_N$ | ... | ... | ... |
| Integrator 96 | 0 | $1I_E$ | $2I_F$ | $2I_G$ | $2I_H$ | $2I_I$ | $2I_J$ | $2I_K$ | $2I_L$ | $2I_M$ | ... | ... | ... |
| Integrator 95 | 0 | $1I_E$ | $1I_D$ | $2I_F$ | $3I_E$ | $3I_G$ | $3I_I$ | $3I_J$ | $3I_K$ | $3I_L$ | ... | ... | ... |
| Integrator 94 | $1I_B$ | $2I_C$ | $1I_D$ | $2I_D$ | $3I_E$ | $4I_F$ | $4I_H$ | $4I_J$ | $4I_K$ | $4I_L$ | ... | ... | ... |
| Integrator 93 | $1I_A$ | $2I_B$ | | | | | | | | | | | |
| Integrator 92 | 0 | 0 | | | | | | | | | | | |
| Integrator 91 | 0 | | | | | | $4I_F$ | $4I_H$ | $4I_I$ | $4I_J$ | ... | $4I_K$ | $4I_L$ |
| Output | | | | | | $4I_F$ | | | | | | | |

FIG. 9C

TIME DELAY INTEGRATION SENSOR WITH MULTIPLE SENSOR ARRAYS

CROSS REFERENCE TO RELATED APPLICATION

This application is a continuation-in-part application of U.S. patent application Ser. No. 17/351,235 filed on, Jun. 18, 2021, which claims the priority benefit of Taiwan Patent Application Serial Number 109122077, filed on Jun. 30, 2020, and Taiwan Patent Application Serial Number 110111970, filed on Mar. 31, 2021, and the full disclosures of which are incorporated herein by reference.

BACKGROUND

1. Field of the Disclosure

This disclosure generally relates to a time delay integration (TDI) sensor and, more particularly, to a TDI Complementary Metal-Oxide-Semiconductor (CMOS) image sensor that implements the rolling shutter operation by spatial compensation.

2. Description of the Related Art

The time delay integration (TDI) sensor uses an area array image sensor to capture images from an imaging platform that is moving relative to the imaged object or scene at a constant speed. The TDI sensor is conceptually considered as the stack of linear arrays, wherein each linear array moves across a same point of the scene at a time period that the image sensor moves a distance of one pixel.

Conventionally, the charge-coupled device (CCD) technology has been used for TDI applications because CCDs intrinsically operate by shifting charge from pixel to pixel across the image sensor to allow charges between pixels to integrate when the image sensor moves across a same point of the imaged scene. However, CCD technology is relatively expensive to fabricate and CCD imaging devices consume relatively high power.

Although using a CMOS circuit can achieve lower power, higher degree of integration and higher speed, the existing designs suffer from higher noises. Although a 4-transistor (4T) structure can be used to minimize noises, the 4T pixels are clocked using a rolling shutter technique. Using the rolling shutter clocking can cause artifacts in the captured image since not all pixels are integrated over the same time period.

Therefore, U.S. Pat. No. 9,148,601 provides a CMOS image sensor for TDI imaging. Please refer to FIG. 1, the CMOS image sensor includes multiple pixel columns 112, and each pixel column is arranged to be parallel to an along-track direction $D_{a\_t}$. For compensating the integration interval of the rolling shutter of the CMOS image sensor, a physical offset 150 is further arranged between two adjacent pixels of each pixel column 112, wherein if the pixel column 112 has N rows, each physical offset 150 is equal to a pixel height divided by N.

Accordingly, the present disclosure further provides a TDI CMOS image sensor that implements the rolling shutter operation by spatial compensation.

SUMMARY

The present disclosure provides a TDI CMOS image sensor with a separation space determined according to the pixel height, the line time difference of a rolling shutter and the frame period.

The present disclosure further provides a TDI CMOS image sensor that changes the line time difference corresponding to different conditions with a fixed separation space.

The present disclosure further provides a TDI CMOS image sensor that arranges two separately operated pixel arrays in an along-track direction to increase a number of times of integrating pixel data corresponding to the same position of a scene.

To achieve the above objective, the present disclosure provides a TDI CMOS image sensor that captures an image frame using a rolling shutter and moves with respect to a scene in an along-track direction. The image sensor includes a first pixel array and a second pixel array each having multiple pixel columns. Each of the pixel columns includes multiple pixels arranged in the along-track direction, and two adjacent pixels of each of the pixel columns have a separation space therebetween, wherein the separation space is a multiplication of a pixel height in the along-track direction by a time ratio of a line time difference of the rolling shutter and a frame period of capturing the image frame. The first pixel array and the second pixel array are arranged along the along-track direction, and each of the pixel columns of the first pixel array is aligned with a corresponding pixel column of the second pixel array configured to sequentially cross a same position of the scene.

In addition, the present disclosure further provides a TDI CMOS image sensor that captures an image frame using a rolling shutter and moves with respect to a scene in an along-track direction. The image sensor includes a first pixel array and a second pixel array each having multiple pixel columns. Each of the pixel columns includes multiple pixels arranged in the along-track direction, and two adjacent pixels of each of the pixel columns have a separation space therebetween, wherein the separation space is a summation of a pixel height in the along-track direction and a multiplication of the pixel height by a time ratio of a line time difference of the rolling shutter and a frame period of capturing the image frame. The first pixel array and the second pixel array are arranged along the along-track direction, and each of the pixel columns of the first pixel array is aligned with a corresponding pixel column of the second pixel array configured to sequentially cross a same position of the scene.

The present disclosure further provides a TDI CMOS image sensor that captures an image frame using a rolling shutter and moves with respect to a scene in an along-track direction. The image sensor includes a first pixel array, a second pixel array and multiple integrators. Each of the first pixel array and the second pixel array includes multiple pixel columns. Each of the pixel columns includes multiple pixels arranged in the along-track direction, and two adjacent pixels of each of the pixel columns have a separation space therebetween, wherein the separation space is a multiplication of a pixel height in the along-track direction by a time ratio of a line time difference of the rolling shutter and a frame period of capturing the image frame. The multiple integrators respectively store pixel data in successive image frames corresponding to a same position of the scene. In one line time difference, each of the integrators is configured to integrate the pixel data in continuous image frames corresponding to the same position of the scene. In double line time difference, each of the integrators is configured to integrate the pixel data in non-continuous image frames corresponding to the same position of the scene. The first pixel array and the second pixel array are arranged along the along-track direction, and each of the pixel columns of the first pixel array is aligned with a corresponding pixel column of the second pixel array configured to sequentially cross the same position of the scene.

In the present disclosure, the separation space is not directly related to a size of the pixel array (i.e. a number of pixels), and the separation space can be determined once the frame period and the line time difference are determined.

BRIEF DESCRIPTION OF THE DRAWINGS

Other objects, advantages, and novel features of the present disclosure will become more apparent from the following detailed description when taken in conjunction with the accompanying drawings.

FIGS. 7A to 7C are operational schematic diagrams of the TDI CMOS image sensor of FIG. 2 at different line time differences.

FIGS. 8A to 8C are other operational schematic diagrams of the TDI CMOS image sensor of FIG. 2 at different line time differences.

FIGS. 9A to 9C are operational schematic diagrams of the TDI CMOS image sensor of FIG. 5 at different line time differences.

DETAILED DESCRIPTION OF THE EMBODIMENT

It should be noted that, wherever possible, the same reference numbers will be used throughout the drawings to refer to the same or like parts.

The CMOS image sensor of the present disclosure compensates a line time difference in time delay integration (TDI) imaging using a rolling shutter by arranging a separation space between pixels in an along-track direction. Accordingly, pixel data corresponding to the same position of an imaged scene is integrated in successive image frames so as to increase the signal-to-noise ratio (SNR), wherein a number of integration is related to a size of pixel array.

The concept of TDI imaging is known to the art, and the present disclosure is to eliminate the imaging distortion generated in a TDI CMOS image sensor using rolling shutter technique.

Figure 1:
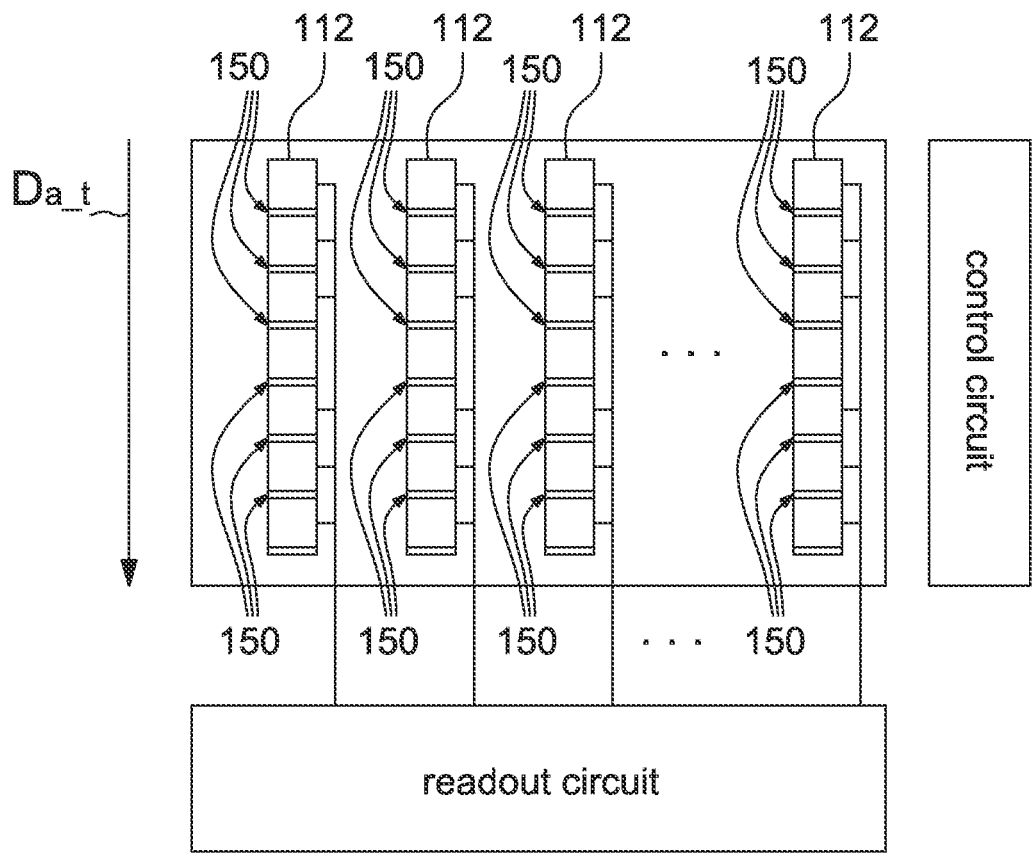
FIG. 1 is a schematic diagram of a CMOS image sensor for time delay integration (TDI) imaging.
Figure 2:
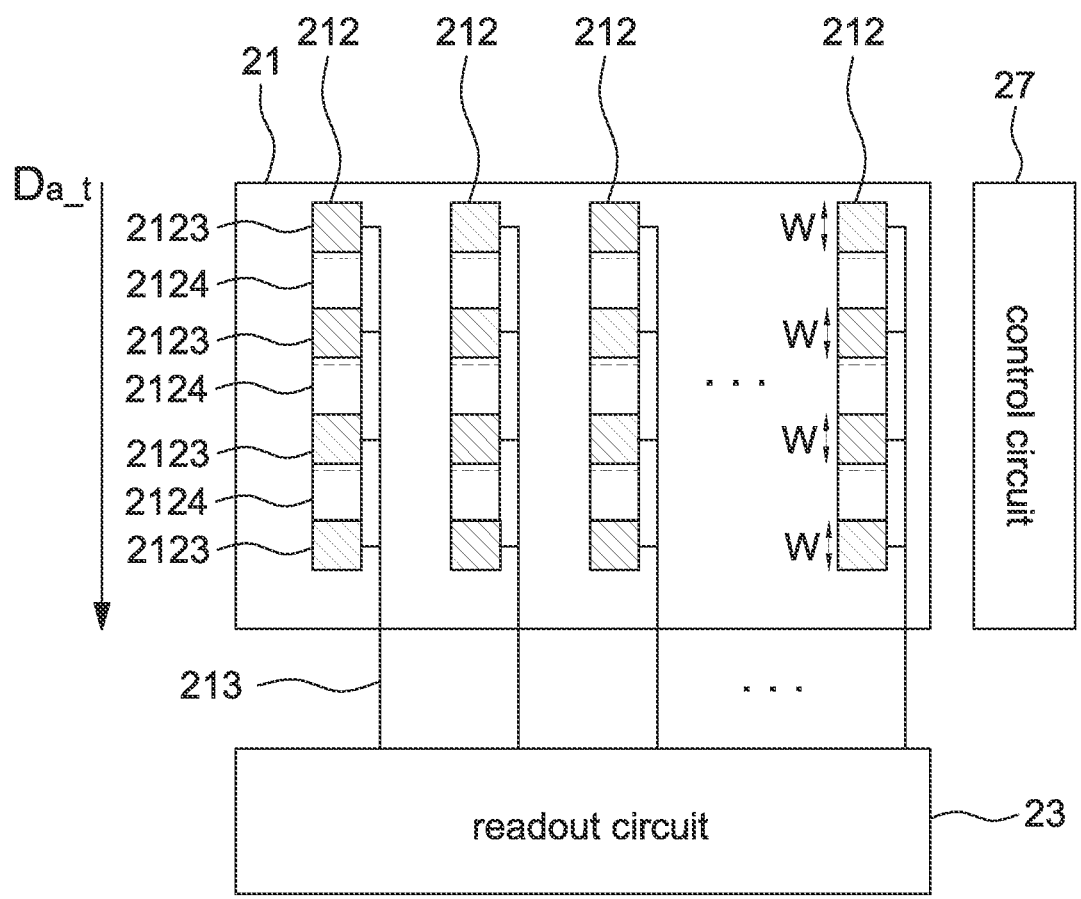
FIG. 2 is a schematic diagram of a TDI CMOS image sensor according to a first embodiment of the present disclosure.

Please refer to FIG. 2, it is a schematic diagram of a TDI CMOS image sensor 200 according to a first embodiment of the present disclosure. The TDI CMOS image sensor 200 captures image frames using a rolling shutter, and moves toward an along-track direction $D_{a\_t}$ with respect to a scene, wherein the scene is determined according to an application of the TDI CMOS image sensor 200. For example, when the TDI CMOS image sensor 200 is applied to a scanner, the scene is a scanned document; whereas, when the TDI CMOS image sensor 200 is applied to a satellite or aircraft, the scene is a ground surface.

The operation of the rolling shutter is known to the art, and thus details thereof are not described herein.

The TDI CMOS image sensor 200 includes a pixel array 21. The pixel array 21 includes multiple pixel columns 212. Each of the pixel columns 212 includes multiple pixels 2123 (e.g., shown as regions filled with slant lines herein) arranged in the along-track direction $D_{a\_t}$ (e.g., shown as a longitudinal direction of the pixel array 21). Two adjacent pixels of each pixel column 212 have a separation space 2124 (e.g., shown as blank regions herein) therebetween.

Figure 3:
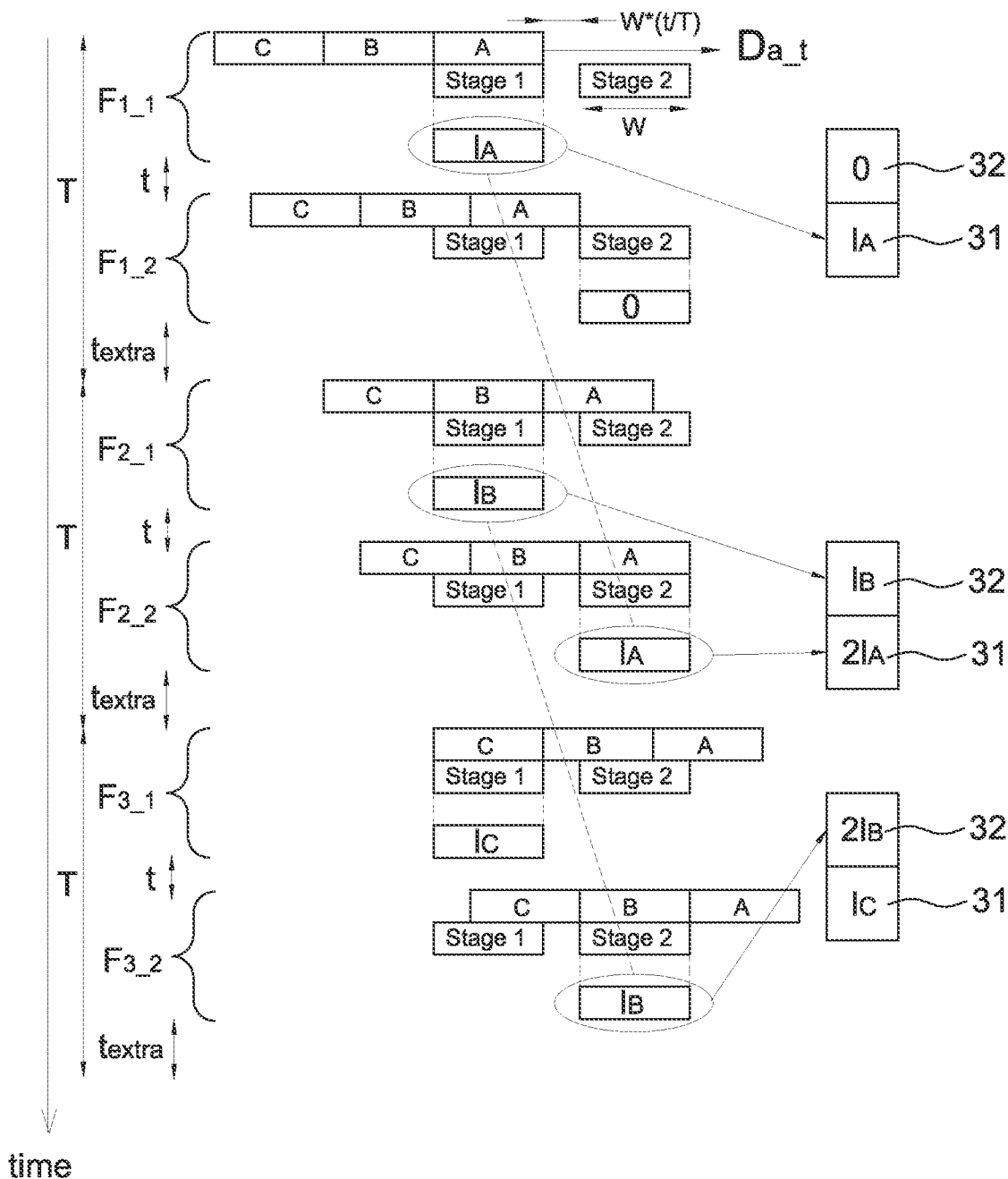
FIG. 3 is an operational schematic diagram of the TDI CMOS image sensor of FIG. 2.

Please refer to FIG. 3, it is an operational schematic diagram of the TDI CMOS image sensor 200 of FIG. 2. In one aspect, the separation space 2124 is equal to a multiplication of a pixel height W of one pixel 2123 in the along-track direction $D_{a\_t}$ by a time ratio of a line time difference t of the rolling shutter and a frame period T of capturing the image frame (e.g., FIG. 3 showing three image frames), i.e. separation space=W×t/T.

In the present disclosure, the line time difference t is a time interval between a time of starting or ending exposure of two adjacent pixel rows.

In FIG. 3, it is assumed that the scene includes 3 positions or objects A, B and C moving rightward (i.e. along-track direction $D_{a\_t}$). Stage1 and Stage2 indicate two pixel rows of each pixel column 212, wherein the separation space W×t/T is arranged between Stage1 and Stage2. In the present disclosure, the frame period T is determined according to brightness of the scene and a sensitivity of the pixel array 21. A moving speed of the TDI CMOS image sensor 200 is set as the pixel height W divided by the frame period T.

Because FIG. 3 assumes that the pixel column 212 of the pixel array 21 has two pixel rows, the frame period T, in which the TDI CMOS image sensor 200 captures one image frame, includes two line times, which have a line time difference t. Herein, a line time is referred to a processing time interval for accomplishing the exposing and reading of one pixel row. For example, FIG. 3 shows that a first image frame includes two pixel rows $F_{1\_1}$ and $F_{1\_2}$; a second image frame includes two pixel rows $F_{2\_1}$ and $F_{2\_2}$; and a third image frame includes two pixel rows $F_{3\_1}$ and $F_{3\_2}$.

In this embodiment, the TDI CMOS image sensor 200 further includes multiple integrators, e.g., FIG. 3 showing two integrators 31 and 32, wherein the integrators are, for example, a buffer (i.e. digital integrator) or a capacitor (i.e. analog integrator), and a number of the integrators are preferably corresponding to a number of pixel columns 212 so as to determine a width of the imaged scene. The integrators 31 and 32 are respectively used to integrate pixel data in adjacent image frames corresponding to a same position or object of the scene.

For example, in the first image frame (e.g., including $F_{1\_1}$ and $F_{1\_2}$), Stage1 senses pixel data of the position or object A of the scene, and integrates (or adds) to the integrator 31, e.g., shown as $I_A$; now, the integrator 32 does not yet integrate (or store) any pixel data, e.g., shown as 0.

As the scene moves in the along-track direction $D_{a\_t}$ at a speed W/T, in the second image frame (e.g., including $F_{2\_1}$ and $F_{2\_2}$), Stage1 senses pixel data of the position or object B of the scene, and integrates (or adds) to the integrator 32, e.g., shown as $I_B$; and Stage2 senses pixel data of the position or object A of the scene, and integrates (or adds) to the integrator 31, e.g., shown as $2I_A$ (indicating integrated by two times).

As the scene continuously moves in the along-track direction $D_{a\_t}$ at the speed W/T, in the third image frame (e.g., including $F_{3\_1}$ and $F_{3\_2}$), the pixel data $2I_A$ associated with the object A already integrated in the integrator 31 is read out at first. Next, Stage1 senses pixel data of the position or object C of the scene, and integrates (or adds) to the integrator 31, e.g., shown as $I_C$; and Stage2 senses pixel data of the position or object B of the scene, and integrates (or adds) to the integrator 32, e.g., shown as $2I_B$ (indicating integrated by two times). When the scene is continuously imaged, the TDI CMOS image sensor 200 continuously integrates and reads pixel data using the process as shown in FIG. 3 to improve the SNR of the captured image frame.

In one aspect, the frame period T (i.e. exposure interval of one image frame) is larger than a summation of row exposure times for capturing all pixel rows of the pixel array 21 using the rolling shutter, e.g., FIG. 3 showing that an extra time $t_{extra}$ is left after a second pixel row of every image frame is exposed and read.

In one non-liming aspect, within a time difference (i.e. $t_{extra}$) between the frame period T and the summation of row exposure times, the image sensor 200 enters a sleep mode to save power.

In one non-liming aspect, a column analog-to-digital converter (ADC) (e.g., included in the readout circuit 23) of the TDI CMOS image sensor 200 performs, within the time difference $t_{extra}$, the analog-digital (AD) conversion on pixel signals of auxiliary pixels (e.g., dark pixels), external voltages or temperatures of an external temperature sensor of the pixel array 21. More specifically, within the time difference $t_{extra}$, the column ADC is used to perform the AD conversion on sensing signals outside the pixel columns 212 so as to broaden applications of the TDI CMOS image sensor 200. In this aspect, a line time is preferably set as the minimum time required for processing one row of pixel data.

In this embodiment, the readout circuit 23 samples every pixel using, e.g., correlation double sampling (CDS).

Please refer to FIG. 2 again, in another aspect, the separation space 2124 is equal to a summation of a pixel height W in the along-track direction $D_{a\_t}$ and a multiplication of the pixel height W by a time ratio of a line time difference t of the rolling shutter and a frame period T of capturing the image frame, i.e. separation space=W×(y+t/T).

Figure 4A:
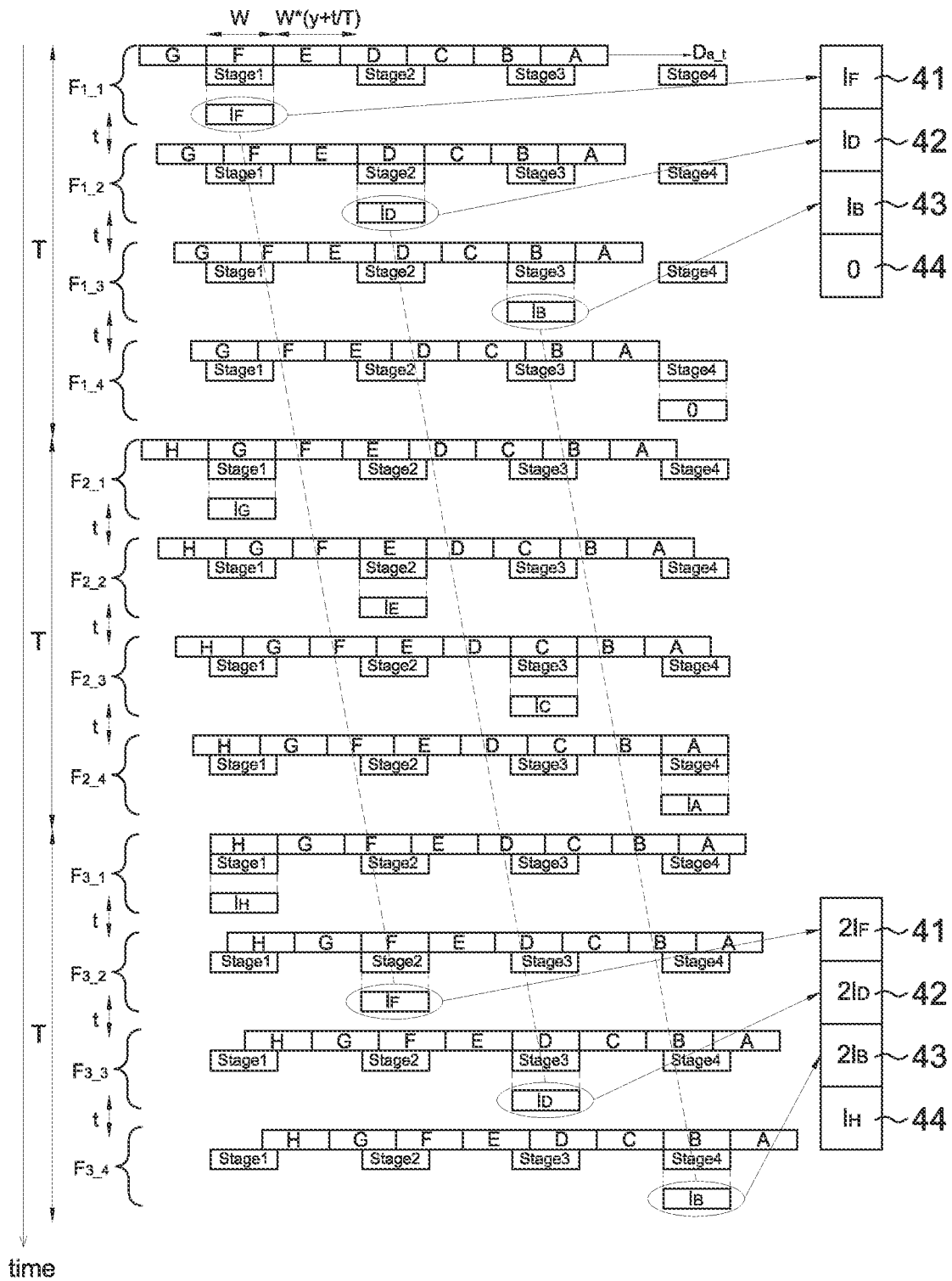
FIG. 4A is another operational schematic diagram of the TDI CMOS image sensor of FIG. 2.

Please refer to FIG. 4A together, it is another operational schematic diagram of the TDI CMOS image sensor 200 of FIG. 2. In FIG. 4A, it is assumed that one scene includes eight positions or objects A to H, and moves rightward (i.e. along-track direction $D_{a\_t}$). Stage1 to Stage 4 indicate four pixel rows of one pixel column 212, wherein the separation space W×(y+t/T) is arranged between two adjacent pixels, wherein y=0 or a positive integer. FIG. 4A shows an aspect that y=1; and an aspect of y=0 is shown in FIG. 3.

Because FIG. 4A assumes that the pixel array 21 includes four pixel rows, thus the frame period T of the TDI CMOS image sensor 200 for capturing one image frame includes four line times, which have a line time difference t from each other. For example, FIG. 4A shows that one image frame includes four pixel rows $F_{1\_1}$ to $P_{1\_4}$; a next image frame includes four pixel rows $F_{2\_1}$ to $F_{2\_4}$; and a further next image frame includes four pixel rows $F_{3\_1}$ to $F_{3\_4}$; and so on.

Similarly, the TDI CMOS image sensor 200 further includes multiple integrators, e.g., FIG. 4A showing four integrators 41 to 44. The integrator 41 is used to integrate pixel data in a first image frame (e.g., frame including $F_{1\_1}$ to $F_{1\_4}$) and a second image frame (e.g., frame including $F_{3\_1}$ to $F_{3\_4}$) corresponding to the same position (e.g., position or object F) of the scene, wherein the first image frame and the second image frame is separated by one image frame (e.g., frame including $F_{2\_1}$ to $F_{2\_4}$). The operations of other integrators 42 to 44 are identical to that of the integrator 41, and the difference is in integrating the pixel data at different positions or objects.

It is seen from FIG. 4A that a first pixel (e.g., Stage1) in the first image frame for sensing pixel data (e.g., $I_F$) of the same position (e.g., F) and a second pixel (e.g., Stage2) in the second image frame for sensing pixel data (e.g., $I_F$) of the same position (e.g., F) are two adjacent pixels of the same pixel column 212 in the pixel array 21. Therefore, the integrators (e.g., 41 to 44) do not integrate the pixel data $I_F$ in the first pixel and the second pixel corresponding to the same position within a frame period of the one image frame between the first image frame and the second image frame. The sensing and integration of positions or objects D and B are shown by dashed lines and arrows in FIG. 4A.

In the aspect of FIG. 4A, because the integrators 41 to 44 integrate pixel data in the image frames separated by one image frame (e.g., frame including $F_{2\_1}$ to $F_{2\_4}$) corresponding to the same position or the same object of a scene, if it is assumed that the pixel columns 212 have N pixels, the integrators 41 to 44 integrate N/2 times of pixel data corresponding to the same position or the same object of the scene.

The pixel data of the image frame $F_{2\_1}$ to $F_{2\_4}$ is integrated in another group of integrators, wherein the pixel data of the same position or the same object of the scene is also integrated by skipping one image frame (e.g., frame including $F_{3\_1}$ to $F_{3\_4}$).

When y=n, a same position of the scene is sensed by a next adjacent pixel of the same pixel column 212 after n image frames. Once the control signal outputted by the control circuit 27 is properly arranged, the pixel data of the same position or object of the scene is accurately integrated in the same integrator.

Figure 4B:
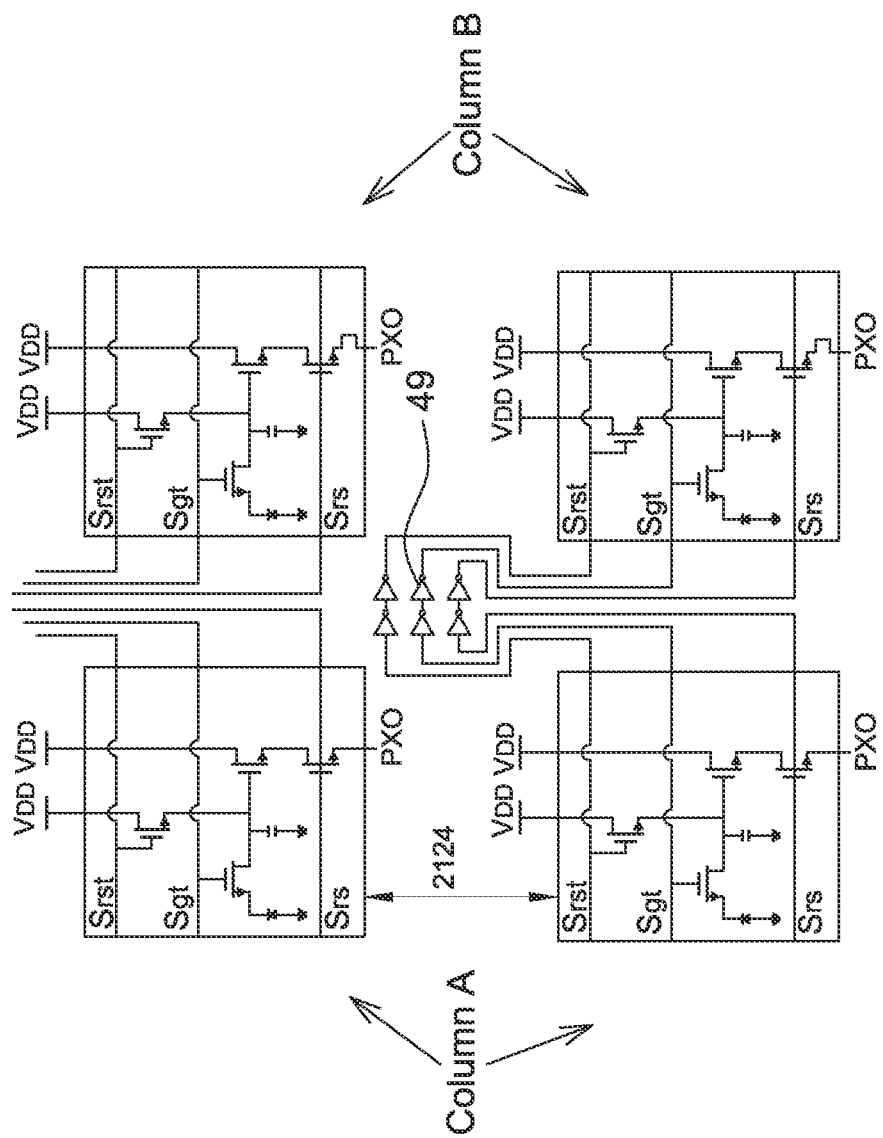
FIG. 4B is a schematic diagram of arranging buffers within the separation space of the TDI CMOS image sensor of FIG. 2.

In addition, in the aspect of FIG. 4A, because adjacent pixels of the pixel columns 212 have a larger separation space 2124, in the case that a wider imaged scene image is required, it is possible to arrange buffers in the separation space 2124 every predetermined number of pixel columns to buffer or amplify control signals of the pixel row. For example as shown in FIG. 4B, in the separation space 2124, the buffers 49 are arranged to buffer or amplify pixel control signals, e.g., including the reset signal Srst, signal transfer signal Sgt and row selection signal Srs, but not limited to. In this way, even a pixel array having a large number of pixel columns can still operate accurately.

Figure 5:
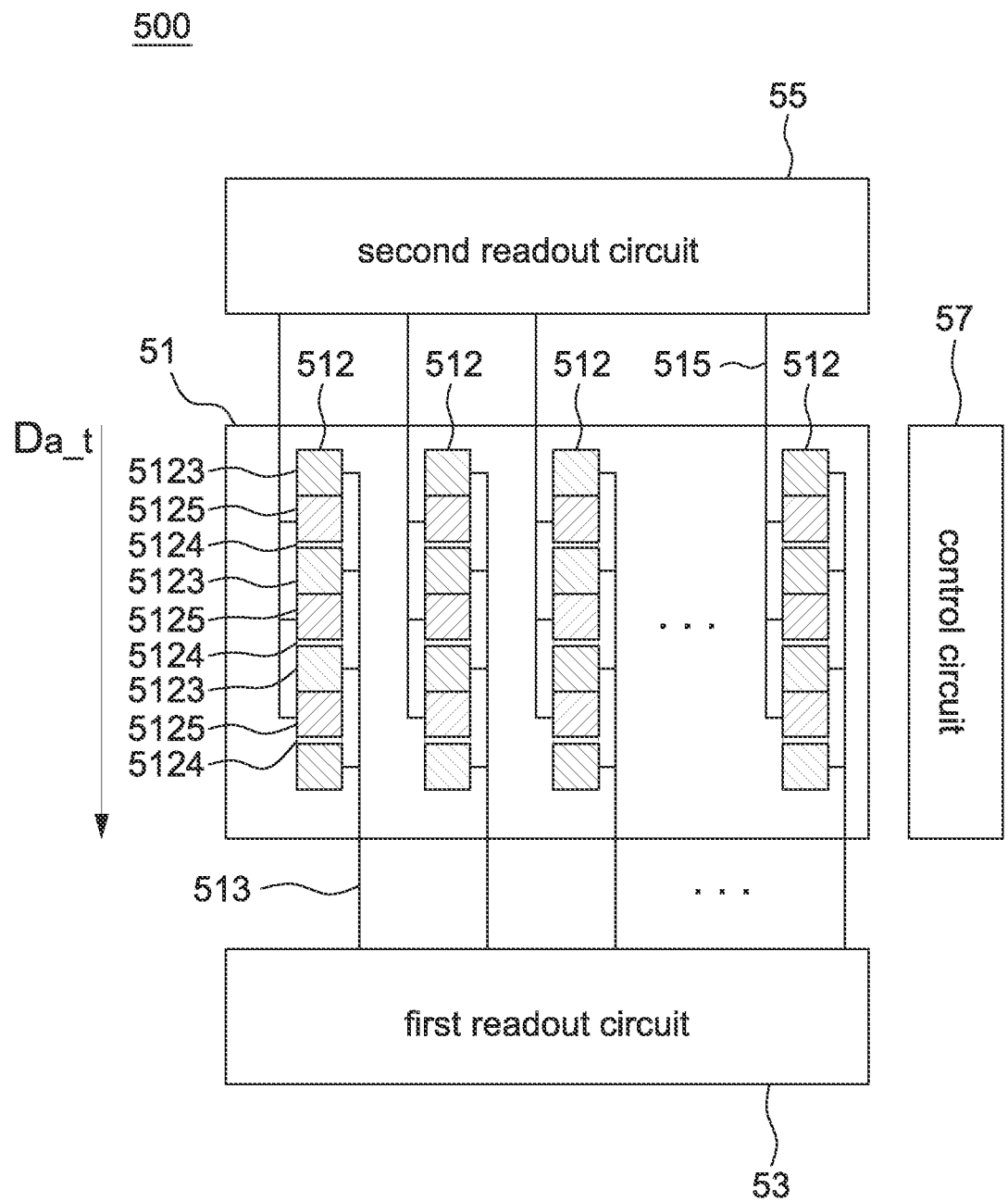
FIG. 5 is a schematic diagram of a TDI CMOS image sensor according to a second embodiment of the present disclosure.

Please refer to FIG. 5, it is a schematic diagram of a TDI CMOS image sensor 500 according to a second embodiment of the present disclosure. The TDI CMOS image sensor 500 is also captures an image frame using a rolling shutter, and moves toward an along-track direction $D_{a\_t}$ with respect to a scene.

The TDI CMOS image sensor 500 includes a pixel array 51. The pixel array 51 includes multiple pixel columns 512 each including multiple pixels arranged in the along-track direction $D_{a\_t}$. A separation space 5124 is arranged between two adjacent pixel groups to compensate a line time difference in using the rolling shutter, wherein each pixel group includes a first pixel 5123 and a second pixel 5215 directly connected to each other, i.e. no separation space 5124 therebetween.

The TDI CMOS image sensor 500 further includes a first readout circuit 53 and a second readout circuit 55. As shown in FIG. 5, the first readout circuit 53 is coupled to multiple first pixels 5123 in the pixel columns 512 via a readout line 513 so as to read pixel data of the first pixels 5123, and the second readout circuit 55 is coupled to multiple second pixels 5125 in the pixel columns 512 via a readout line 515 so as to read pixel data of the second pixels 5125.

Figure 6:
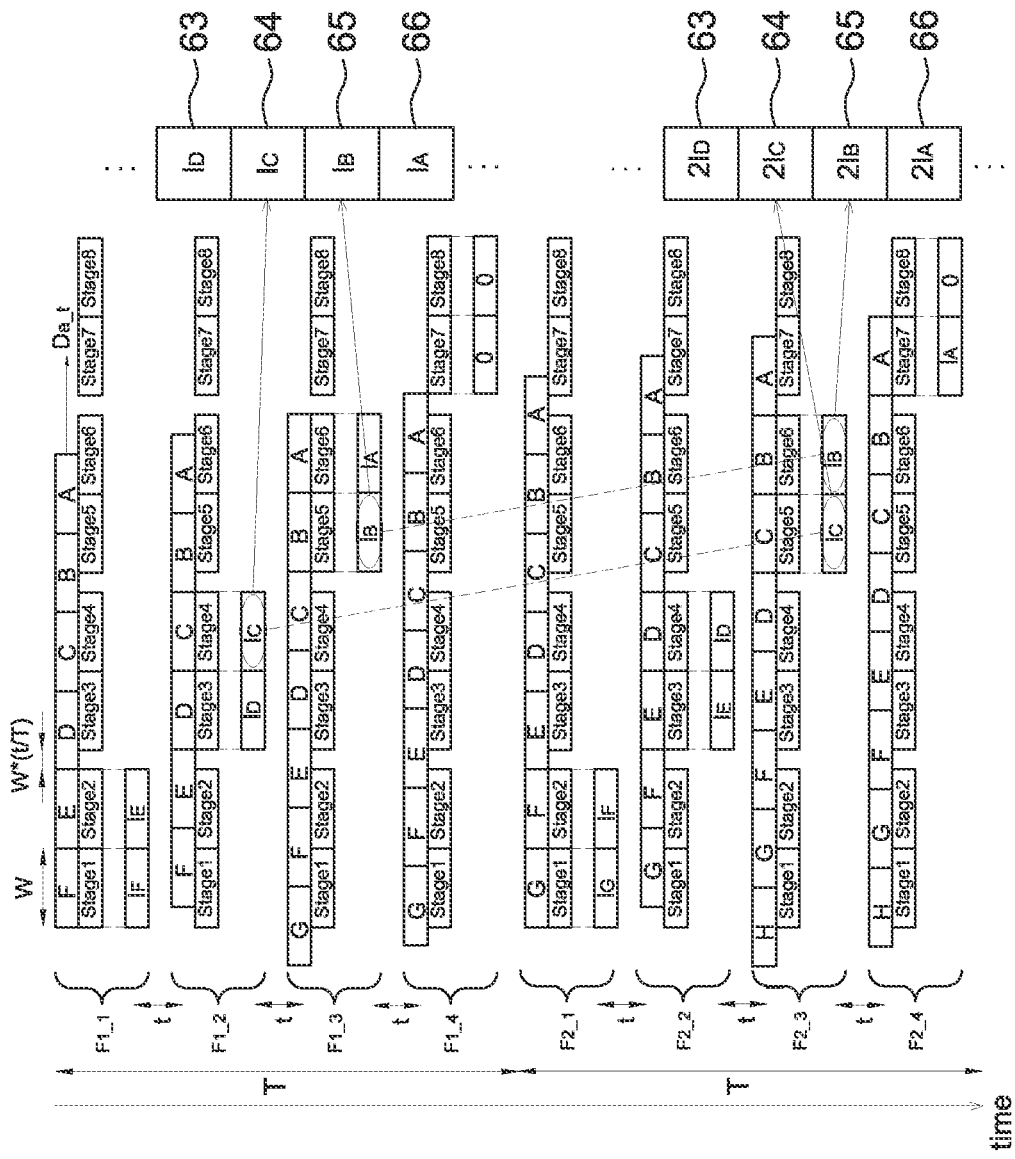
FIG. 6 is an operational schematic diagram of the TDI CMOS image sensor of FIG. 5.

Please refer to FIG. 6, it shows an operational schematic diagram of the TDI CMOS image sensor 500 in FIG. 5. In one aspect, the separation space 5124 is a multiplication of a pixel height W in the along-track direction $D_{a\_t}$ by a time ratio of a line time difference t of the rolling shutter and a frame period T of capturing the image frame (e.g., FIG. 6 showing two image frames), i.e. separation space=W×t/T.

In FIG. 6, it is assumed that a scene includes eight positions or objects A to H, and moves rightward (i.e. along-track direction $D_{a\_t}$).

In this embodiment, the readout circuits 53 and 55 uses, e.g., CDS to sample every pixel. In FIG. 6, Stage1 and Stage2, Stage3 and Stage 4, Stage5 and Stage 6, Stage7 and Stage 8 respectively indicate one pixel group of one pixel column 512, wherein Stage1, Stage3, Stage5 and Stage7 are first pixels 5123, and Stage2, Stage4, Stage6 and Stage8 are second pixels 5125. The separation space W×t/T is arranged between two adjacent pixel groups.

Because it is assumed that the pixel array 51 in FIG. 6 has four pixel groups in the along-track direction $D_{a\_t}$, a frame period T that the TDI CMOS image sensor 500 captures one image frame includes 4 line times, which have a line time difference t between each other. For example, FIG. 6 shows that a first image frame includes four rows of pixel groups $F_{1\_1}$ to $F_{1\_4}$; and a second image frame includes four rows of pixel groups $F_{2\_1}$ to $F_{2\_4}$.

In this embodiment, the first pixel 5123 and the second pixel 5125 of each pixel group are exposed simultaneously, and the pixel data thereof is respectively integrated by the first readout circuit 53 and the second readout circuit 55 simultaneously.

For example, in the line time of $F_{1\_2}$ of a first image frame (e.g., frame including $F_{1\_1}$ to $F_{1\_4}$), Stage3 and Stage4 are exposed at the same time, and pixel data of Stage3 (e.g., $I_D$) is integrated by the first readout circuit 53 to the integrator 63, and pixel data of Stage4 (e.g., $I_C$) is integrated by the second readout circuit 55 to the integrator 64. In the line time of $F_{1\_3}$ of the first image frame, Stage5 and Stage6 are exposed at the same time, and pixel data of Stage5 (e.g., $I_B$) is integrated by the first readout circuit 53 to the integrator 65, and pixel data of Stage6 (e.g., $I_A$) is integrated by the second readout circuit 55 to the integrator 66. The exposure and integration of other line times in a frame period T of the first image frame are similar to the line times $F_{1\_2}$ and $F_{1\_3}$.

For example, in the line time of $F_{2\_3}$ of a second image frame (e.g., frame including $F_{2\_1}$ to $F_{2\_4}$), Stage5 and Stage6 are exposed at the same time, and pixel data of Stage5 (e.g., $I_C$) is integrated by the first readout circuit 53 to the integrator 64, shown as $2I_C$ indicating integrated by two times; and pixel data of Stage6 (e.g., $I_B$) is integrated by the second readout circuit 55 to the integrator 65, shown as $2I_B$ indicating integrated by two times. The exposure and integration of other line times in a frame period T of the second image frame are similar to the line times $F_{2\_3}$.

For example, the first readout circuit 53 and the second readout circuit 55 are respectively coupled to each integrator via a switching device (e.g., a multiplexer, but not limited thereto). The switching device is controlled by a control signal (e.g., generated by the control circuit 57) to integrate pixel data read by the first readout circuit 53 or the second readout circuit 55 to the same integrator. It is appreciated that FIG. 6 shows only a part of integrators for describing the present disclosure.

More specifically, multiple integrators of the TDI CMOS image sensor 500 respectively store pixel data in the first image frame (e.g., frame including $F_{1\_1}$ to $F_{1\_4}$) and the second image frame (e.g., frame including $F_{2\_1}$ to $F_{2\_4}$), adjacent to each other, corresponding to the same position (e.g., B) of a scene, wherein in the first image frame, pixel data (e.g. $I_B$) corresponding to a same position (e.g., B) of the scene is read by the first readout circuit 53 and integrated to an integrator 65; and in the second image frame, the pixel data (e.g. $I_B$) corresponding to the same position (e.g., B) of the scene is read by the second readout circuit 55 and integrated to the integrator 65. As long as the output signal of the control circuit 57 is corresponding arranged, the pixel data read from different readout circuits is correctly integrated in the same integrator. The method of integrating pixel data of associated pixels by other integrators is similar to the descriptions in this paragraph, and thus is not repeated herein.

In other aspects, the above embodiments of FIG. 2 and FIG. 5 are combinable. For example, a separation space between two adjacent pixel groups is a summation of a pixel height W and a multiplication of the pixel height W by a time ratio of a line time difference t of the rolling shutter and a frame period T of capturing the image frame, i.e. separation space=W×(y+t/T).

In some aspects, the TDI CMOS image sensors 200 and 500 of the present disclosure are operated in different modes, e.g., including a normal mode and a de-noise mode. For example, in the normal mode, the TDI CMOS image sensors 200 and 500 are operated using FIG. 3 to FIG. 4A and FIG. 6 as mentioned above. In a poor environmental condition (e.g., ambient light intensity being smaller than a threshold or noises larger than a noise threshold), the processor (e.g., MCU, DSP or ASIC) of the TDI CMOS image sensors 200 and 500 automatically selects an operation mode according to a current environmental condition, or the user selects the current operation mode using a key, a switch or an APP of the TDI CMOS image sensors 200 and 500.

The processor is connected to the integrators (e.g., 31 to 32, 41 to 44, 63 to 66, 71 to 73, 81 to 84 or 91 to 98) to receive the integrated pixel data for the post-processing.

Details of the TDI CMOS image sensors 200 and 500 having different operation modes are illustrated by an example below. In the de-noise mode, the line time difference of the rolling shutter is twice as that in the normal mode, i.e. 2t. For example, in the de-noise mode, the multiple pixels of the TDI CMOS image sensors 200 and 500 are, within every line time, strong exposed (e.g., having longer exposure time and/or higher gain) to acquire a bright image frame and weak exposed (e.g., having shorter exposure time and/or lower gain) to acquire a dark image frame. Said bright and dark image frames are differenced by a pixel circuit or the readout circuit to generate a difference image frame so as to eliminate noises. The condition needs to change the line time difference is determined according to different applications.

In addition, in one aspect, in the normal mode (e.g., one line time difference t) and the de-noise mode (e.g., double line time difference 2t), the TDI CMOS image sensors 200 and 500 move at the same moving speed with respect to the scene.

Figure 7A:
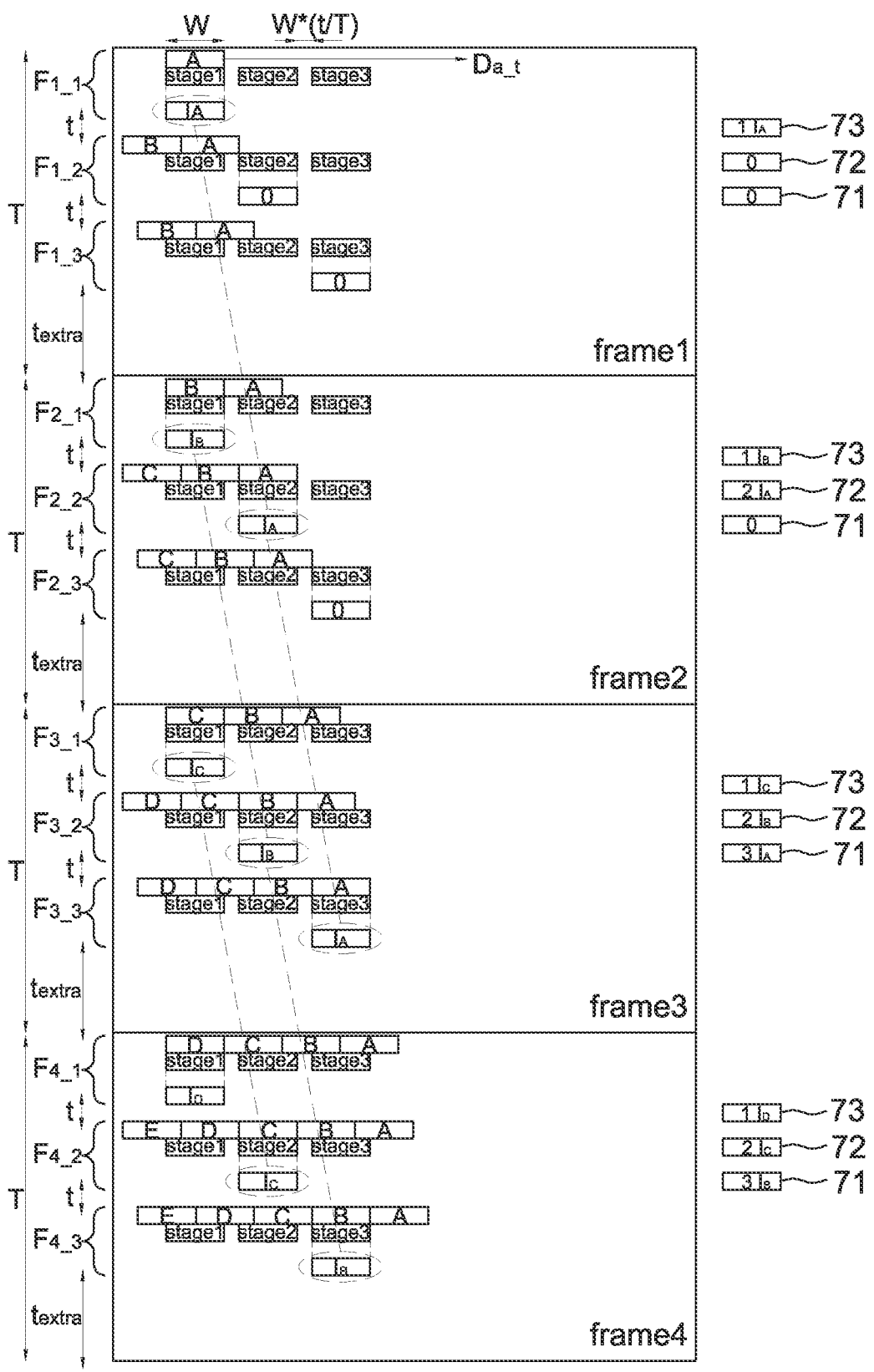
Figure 7B:
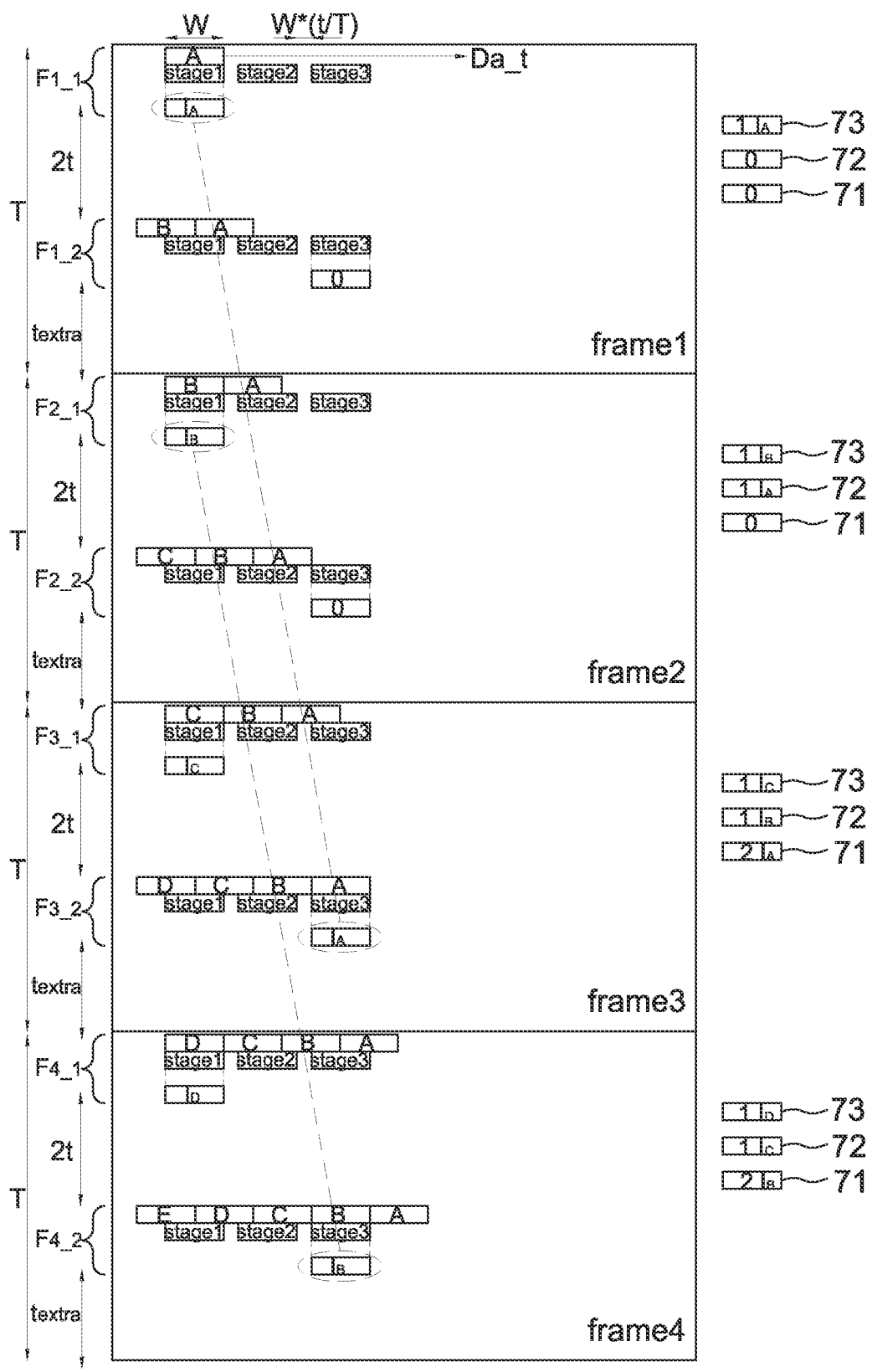

Please refer to FIGS. 7A to 7C, they are operational schematic diagrams of the TDI CMOS image sensor 200 of FIG. 2 operating at different line time differences, wherein the separation space 2124 is equal to W×(t/T). In this aspect, FIG. 7A is the operational schematic diagram of one line time difference; FIG. 7B is the operational schematic diagram of double line time difference; and FIG. 7C is the integration and output of pixel data of the TDI CMOS image sensor 200 at different line time differences.

Since the embodiments of FIGS. 7A to 7C are also adaptable to the TDI CMOS image sensor 200 of FIG. 2, the pixel array 21 thereof includes multiple pixel columns 212 each including multiple pixels 2123 arranged in an along-track direction $D_{a\_t}$, and two adjacent pixels of each of the pixel columns 212 has a separation space 2124 therebetween. In one aspect, the separation space 2124 is a multiplication of a pixel height W in the along-track direction $D_{a\_t}$ by a time ratio of a line time difference t of the rolling shutter and a frame period T of capturing an image frame, and details thereof have been illustrated above.

In this aspect, the TDI CMOS image sensor 200 is illustrated in a way including three integrators 71 to 73. Similarly, the integrators 71 to 73 respectively store pixel data in continuous image frames corresponding to the same position of an imaged scene.

In the normal mode shown in FIG. 7A, the operation of the TDI CMOS image sensor 200 is similar to FIG. 3, i.e. each of the integrators 71 to 73 integrating pixel data in adjacent image frames (e.g., shown as frame1 to frame4) corresponding to the same position of the imaged scene. As shown in FIGS. 7A and 7C, the pixel data $I_A$ of the position or object A is integrated (e.g., shown as $1I_A$, $2I_A$ and $3I_A$) to the integrator in the image frames 1 to 3. In FIGS. 7A and 7C, the integrators 71 to 73 are, for example, first-in-first-out (FIFO) buffers, such that data in one integrator is moved to a next integrator after one image frame. The integrator 71 outputs final integrated pixel data to the processor, but the present disclosure is not limited thereto. The method of integrating pixel data is possibly performed using FIG. 3, i.e. pixel data associated with the same pixel is integrated (or added) to the same integrator.

In the de-noise mode of FIG. 7B, each of the integrators 71 to 73 of the TDI CMOS image sensor 200 integrates pixel data in non-continuous image frames (e.g., separated by one image frame) corresponding to the same position of the imaged scene. As shown in FIGS. 7B and 7C, pixel data $I_A$ of the position or object A is integrated (e.g., respectively shown as $1I_A$ and $2I_A$) to the integrator in the image frames 1 and 3, but is not integrated (e.g., shown as $1I_A$) to the integrator in the image frame 2.

As shown in FIG. 7C, in the double line time difference, pixel data of the imaged position or object is not integrated in continuous image frames such that a number of times of integrating pixel data by each of the integrators 71 to 73 corresponding to the same position of the imaged scene is lower than a number of times of integrating pixel data in the one line time difference. For example FIG. 7C shows that in the one line time difference, the pixel data is integrated by 3 times, but in the double line time difference the pixel data in integrated by 2 times, but the present disclosure is not limited thereto.

Figure 8A:
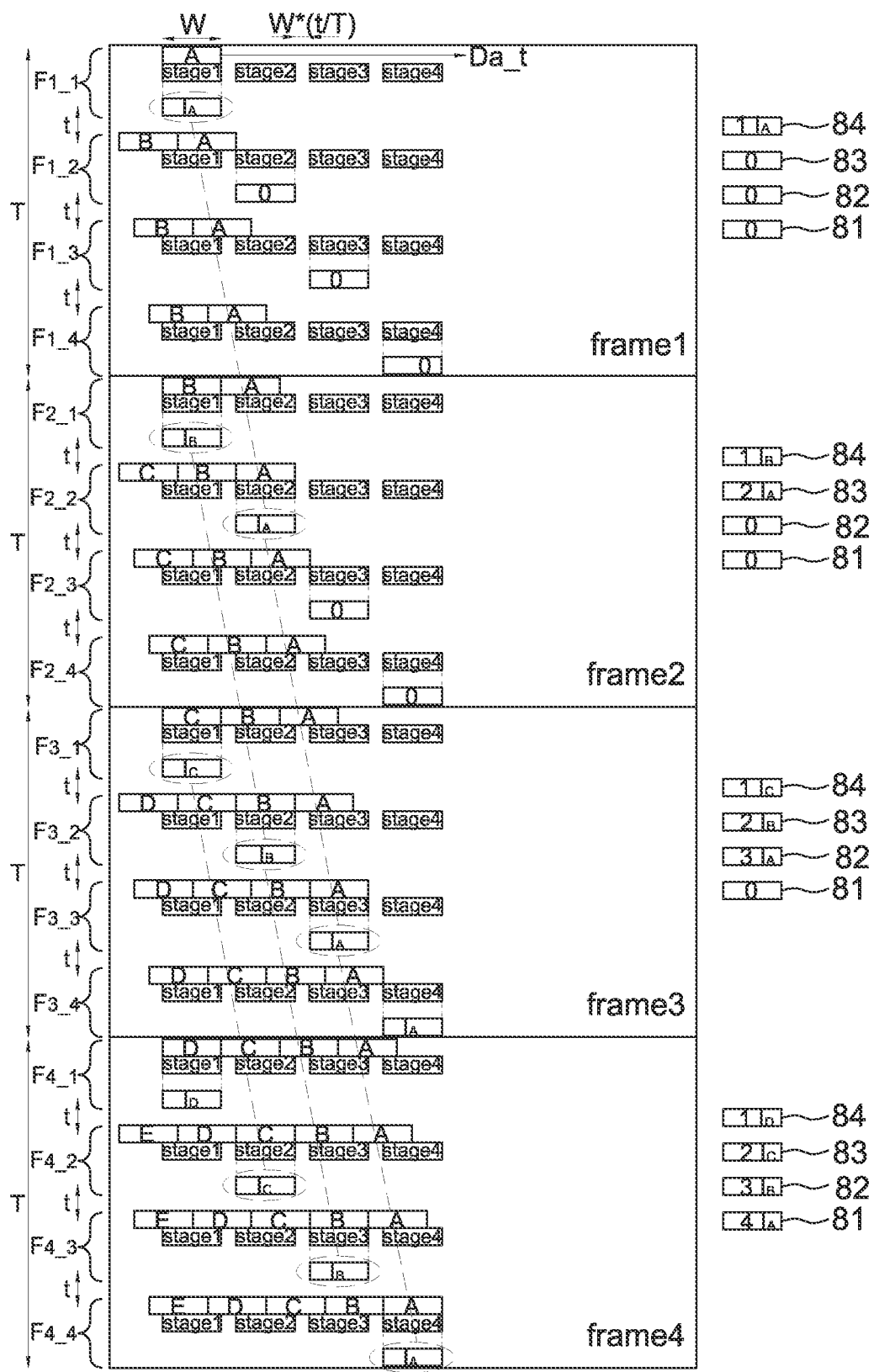
Figure 8B:
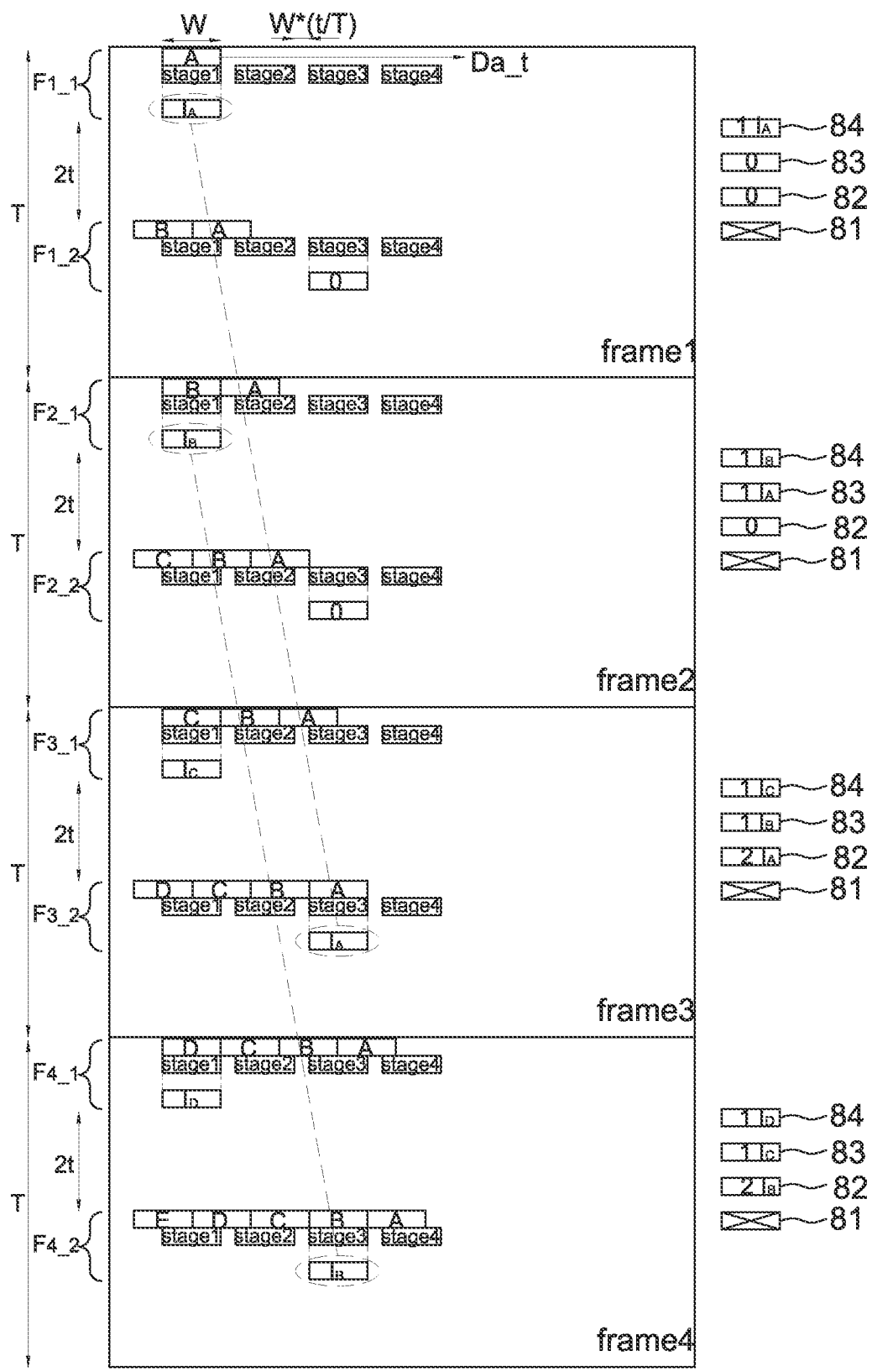

Please refer to FIGS. 8A to 8C, they are other operational schematic diagrams of the TDI CMOS image sensor 200 at different line time differences, wherein the separation space 2124 is equal to W×(t/T). In this aspect, FIG. 8A is the operational schematic diagram of one line time difference; FIG. 8B is the operational schematic diagram of double line time difference; and FIG. 8C is the integration and output of pixel data of the TDI CMOS image sensor 200 at different line time differences. The differences between FIGS. 8A to 8C and FIGS. 7A to 7C are that a number of pixels in every pixel column and a number of integrators are different.

Similarly, the multiple integrators 81 to 84 respectively store pixel data in successive image frames corresponding to the same position of an imaged scene, wherein in the one line time difference, each of the integrators 81 to 84 integrates pixel data in adjacent image frames corresponding to the same position of the imaged scene, e.g., FIGS. 8A and 8C showing that the pixel data $I_A$ is respectively $1I_A$, $2I_A$, $3I_A$, $4I_A$ in the image frames 1 to 4. In the double line time difference, each of the integrators 81 to 84 integrates pixel data in separated image frames corresponding to the same position of the imaged scene, e.g., FIGS. 8B and 8C showing that the pixel data $I_A$ is respectively $1I_A$, $2I_A$ corresponding to the image frames 1 and 3, but the pixel data $I_A$ is not integrated corresponding to the image frame 2.

In addition, FIG. 8B and FIG. 8C also show that in the double line time difference, a part of the integrators (e.g., integrator 81) is deactivated or bypassed, and the integrator (s) among the multiple integrators which does not operate in the double line time difference is not particularly limited.

It is assumed that the image frame 2, image frame 3, and image frame 4 are continuous image frames. In FIG. 8A, the readout circuit 23 (referring to FIG. 2) continuously reads pixel of the pixel columns in the image frame 3, e.g., pixel data of the pixels stage1, stage2 and stage3 are read and integrated to the corresponding integrator. In FIG. 8B, the readout circuit 23 non-continuously reads pixel of the pixel columns in the image frame 3, e.g., pixel data of only the pixels stage1 and stage3 is read and integrated to the corresponding integrator but pixel data of the pixel stage2 is not read.

Figure 9A:
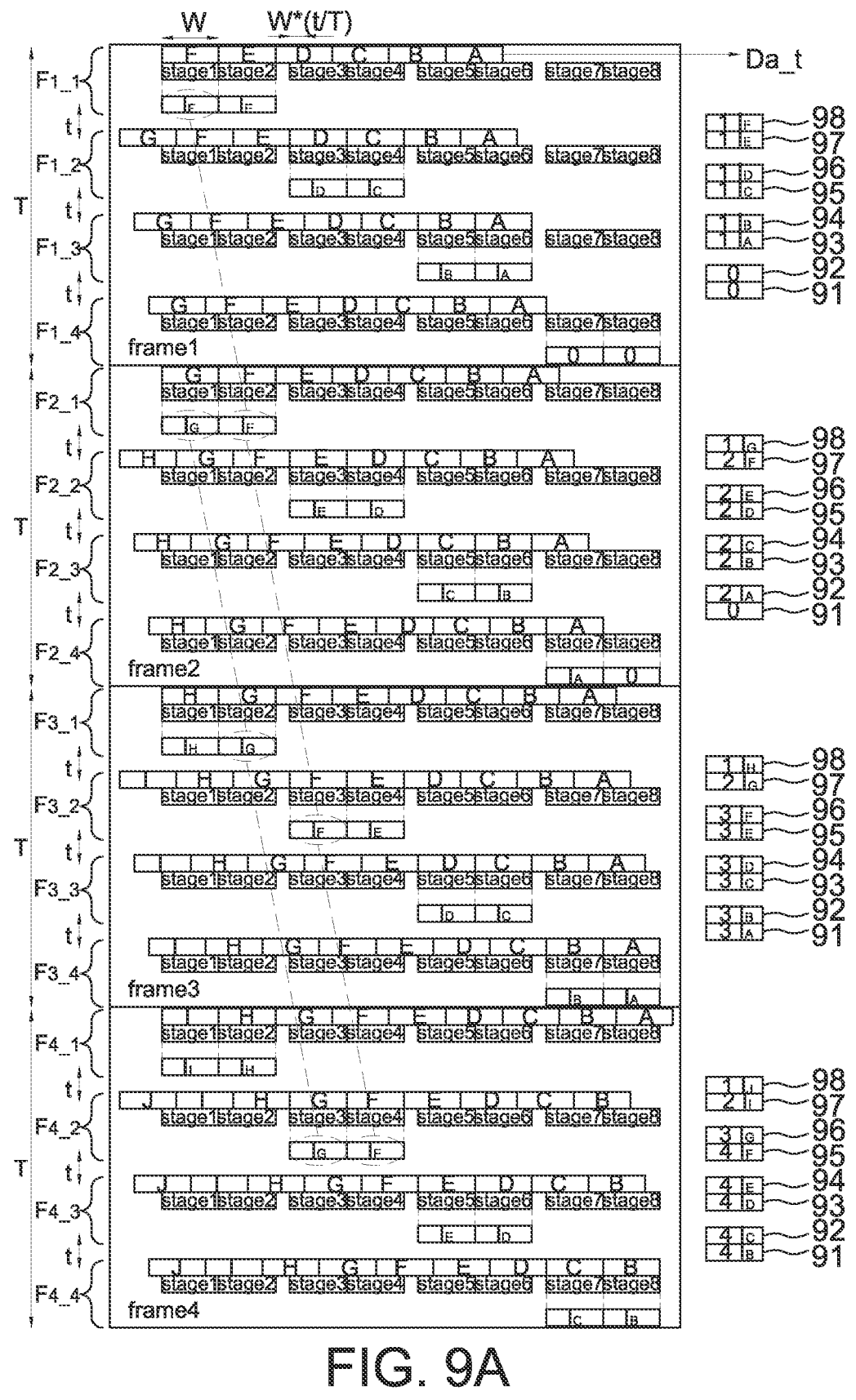
Figure 9B:
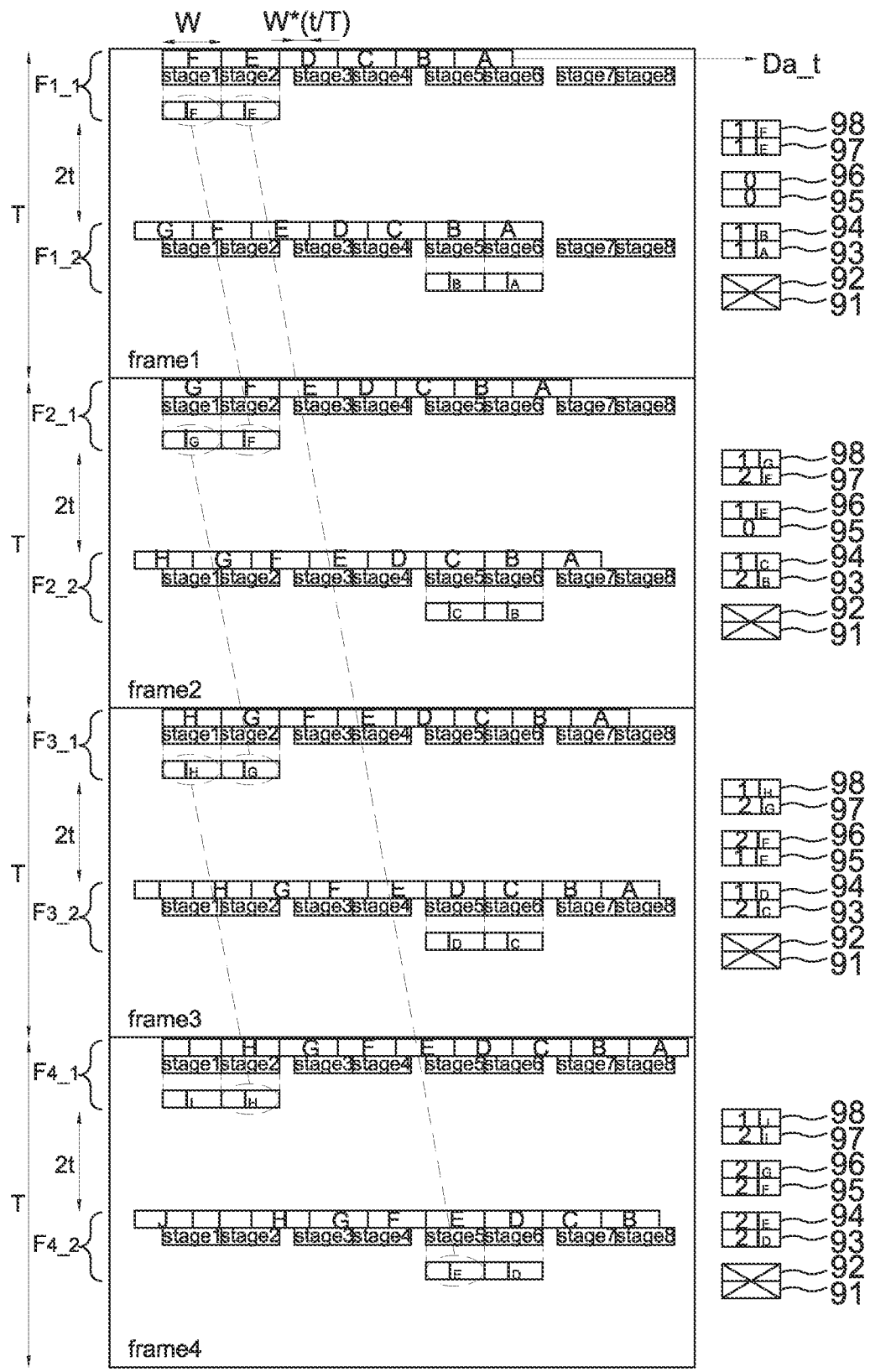

Please refer to FIGS. 9A to 9C, they are operational schematic diagrams of the TDI CMOS image sensor 500 at different line time differences, wherein the separation space 5124 between two pixel groups is W×(t/T). In this aspect, FIG. 9A is the operational schematic diagram of one line time difference; FIG. 9B is the operational schematic diagram of double line time difference; and FIG. 9C is the integration and output of pixel data of the TDI CMOS image sensor 500 at different line time differences.

Since the embodiments of FIGS. 9A to 9C are also adaptable to the TDI CMOS image sensor 500 of FIG. 5, the pixel array 51 thereof includes multiple pixel columns 512 each including multiple pixels arranged in an along-track direction $D_{a\_t}$, and two adjacent pixel groups of the pixels have a separation space 5124 therebetween to compensate a line time difference t of using the rolling shutter, wherein each pixel group includes a first pixel 5123 and a second pixel 5125. In this embodiment, the second pixel 5125 is arranged at a far end of the along-track direction $D_{a\_t}$, and the first pixel 5123 is arranged at a near end of the along-track direction $D_{a\_t}$.

In this aspect, the TDI CMOS image sensor 500 is illustrated in a way including eight integrators 91 to 98.

Similarly, the integrators 91 to 98 respectively store pixel data in successive image frames corresponding to the same position of an imaged scene.

In the normal mode shown in FIG. 9A, the operation of the TDI CMOS image sensor 500 is similar to FIG. 6, i.e. each of the integrators 91 to 98 integrating pixel data in adjacent image frames (e.g., shown as frame1 to frame4) corresponding to the same position of the imaged scene. As shown in FIGS. 9A and 9C, the pixel data $I_F$ of the position or object F is integrated (e.g., shown as $1I_F$, $2I_F$, $3I_F$, $4I_F$, $5I_F$, $6I_F$, $7I_F$ and $8I_F$) to the integrator in the image frames 1 to 8. In FIGS. 9A and 9C, the integrators 91 to 93 are, for example, first-in-first-out (FIFO) buffers, such that the data in one integrator is moved to a next integrator after one image frame. The integrator 91 outputs final integrated pixel data to the processor, but the present disclosure is not limited thereto. The method of integrating pixel data is possibly performed using FIG. 6, i.e. the pixel data associated with the same pixel is integrated (or added) to the same integrator.

In the de-noise mode of FIG. 9B, each of the integrators associated with the first pixel 5123 integrates pixel data in a next image frame corresponding to the same position of the imaged scene, but each of the integrators associated with the second pixel 5123 does not integrate pixel data in the next image frame corresponding to the same position of the imaged scene. As shown in FIGS. 9B and 9C, in the image frame 1, pixel data $I_F$ of the position or object F (e.g., sensed by the pixel stage1, thus associated with the first pixel 5123) is read and integrated in the image frames 1 and 2; in the image frame 1, pixel data $I_E$ of the position or object E (e.g., sensed by the pixel stage2, thus associated with the second pixel 5125) is read and integrated in the image frames 1 and 4, but is not read and integrated in the image frames 2 and 3.

In other words, in this embodiment, in the double line time difference, the pixel data of a same position of the imaged scene is integrated to the associated integrator alternatively in adjacent image frames or spaced image frames. For example in FIGS. 9B and 9C, the pixel data $I_F$ of the position or object F is continuously read and integrated (e.g., respectively shown as $1I_F$ and $2I_F$) in image frames 1 and 2, but is not read or integrated (e.g., shown as $2I_F$) in image frames 3 and 4, and then is continuously read and integrated (e.g., respectively shown as $3I_F$ and $4I_F$) in image frames 5 and 6.

Similarly, because the pixel data of the imaged position or object is not continuously integrated in the double line time difference, a number of times of integrating the pixel data corresponding to the same position of the imaged scene by each of the integrators 91 to 98 is lower than a number of times being integrated in the one line time difference. For example, FIG. 9C shows that the pixel data is integrated (or added) by four times in the double line time difference, but is integrated (or added) by eight times in the one line time difference, but the present disclosure is not limited thereto.

Similarly, in FIGS. 9B and 9C, a part of the integrators (e.g., 91 and 92) are not activated or are bypassed, and the deactivated integrator(s) among the multiple integrators is not particular limited in the double line time difference.

Accordingly, the TDI CMOS image sensors 200 and 500 of the present disclosure select to be operated at difference line time differences with a fixed separation space.

As mentioned above, when a number of stages (i.e. a number of pixel rows) of a pixel array is higher, a number of times of integrating pixel data corresponding to the same position of a scene is higher thereby improving the SNR captured images. However, due to a limitation of an operating speed of pixel array circuit, the number of stages of a pixel array cannot be increased without limitation such that the number of times of integrating pixel data is also limited. Accordingly, the present disclosure further provides a TDI CMOS image sensor that can increase the number of times of integrating pixel data even under the limitation of the operating speed of pixel array circuit.

Figure 10:
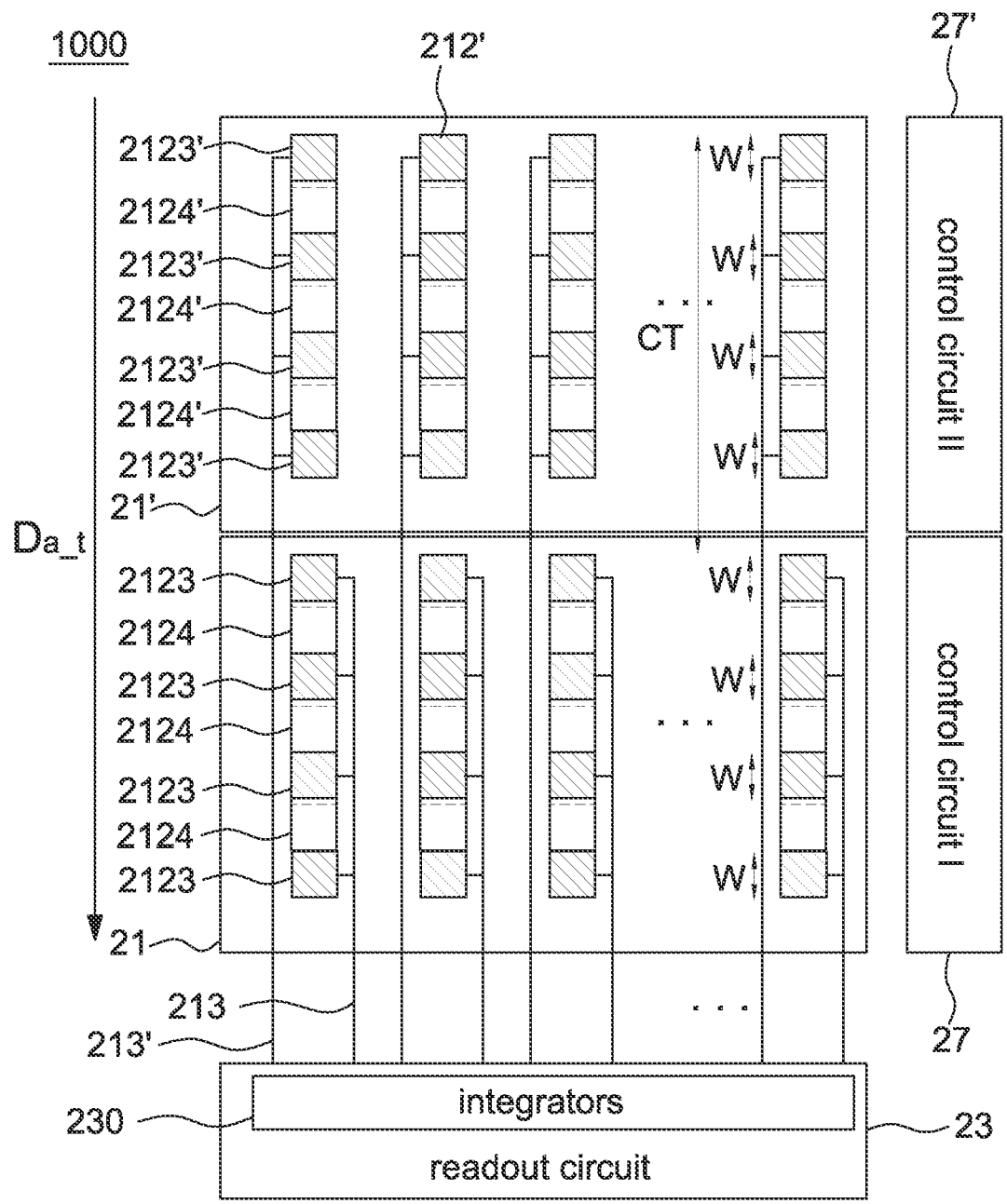
FIG. 10 is a schematic diagram of a TDI CMOS image sensor according to a third embodiment of the present disclosure.

Please refer to FIG. 10, it is a schematic diagram of a TDI CMOS image sensor 1000 according to a third embodiment of the present disclosure. The TDI CMOS image sensor 1000 includes a pixel array (or called a first pixel array hereinafter) 21, a control circuit 27 and a readout circuit 23, which are respectively identical to the pixel array 21, the control circuit 27 and the readout circuit 23 in FIG. 2 and thus details thereof are not repeated herein.

Different from the TDI CMOS image sensor 200 in FIG. 2, the TDI CMOS image sensor 1000 in FIG. 10 further includes a second pixel array 21' and a second control circuit 27', wherein the second pixel array 21' also includes multiple pixel columns 212'. Each of the pixel columns 212' includes multiple pixels 2123' arranged in an along-track direction $D_{a\_t}$, and two adjacent pixels 2323' of each of the pixel columns 212' have a separation space 2124' therebetween. The configuration of the separation space 2124' is identical to that of the separation space 2124 mentioned above.

The readout circuit 23 reads first pixel data of the first pixel array 21 via readout lines 213, and the readout circuit 23 reads second pixel data of the second pixel array 21' via readout lines 213', wherein the layout of the readout lines 213 and 213' is not limited to that shown in FIG. 10 as long as the readout circuit 23 is able to sequentially read the pixel arrays 21 and 21'.

In the third embodiment, the first pixel array 21 and the second pixel array 21' are arranged along the along-track direction $D_{a\_t}$, and each of the pixel columns of the first pixel array 21 is aligned with a corresponding pixel column of the second pixel array 21' so as to sequentially cross the same position of a scene such that corresponding pixel data can be integrated meaningfully.

The control circuit 27 controls operation timing of the first pixel array 21, and the second control circuit 27' controls operation timing of the second pixel array 21'. In one aspect, the first pixel array 21 and the second pixel array 21' operate simultaneously to output pixel data. For example, the control circuit 27 controls the first pixel array 21 to output first pixel data with a rolling shutter from lower pixels to upper pixels 2123 in FIG. 10; and simultaneously the second control circuit 27' controls the second pixel array 21' to output second pixel data with the rolling shutter from lower pixels to upper pixels 2123' in FIG. 10.

In this embodiment, to obtain corresponding pixel data, there is a compensation time CT between acquiring the first pixel data associated with the first pixel array 21 and acquiring the second pixel data (corresponding to the same position or object of a scene of the first pixel data) associated with the second pixel array 21. The compensation time CT is equal to the frame period T multiplied by a quotient obtained by dividing a distance between pixels at corresponding positions (e.g., the highest pixels in FIG. 10) in the first pixel array 21 and the second pixel array 21' by the pixel height W. As mentioned above, as a moving speed of the scene is arranged to move one pixel row per frame period T, it is able to calculate how many frame periods T to which the compensation time CT is equal according to a ratio of a distance of corresponding pixels at two pixel arrays 21 and 21' and the pixel height W. In another aspect, the compensation time CT is equal to a distance between pixels at corresponding positions in the first pixel array 21 and the second pixel array 21' divided by a moving speed of the image sensor (or scene).

As mentioned above, although the first pixel array 21 and the second pixel array 21' are arranged to operate simultaneously (e.g., identical rolling timing) in this embodiment, the second pixel data acquired by the second pixel array 21' within the compensation time CT after the first pixel array 21 begins operation is not integrated with the first pixel data acquired by the first pixel array 21. That is, the second pixel array 21 moves to the same position or object of a scene with the first pixel array 21 after the first pixel array 21 begins operation and passes the compensation time CT.

Therefore, in one aspect, when the image sensor 1000 begins operation, the second control circuit 27' controls the second pixel array 21' to start to operate behind the compensation time CT after the first pixel array 21 begins operation.

Figure 11:
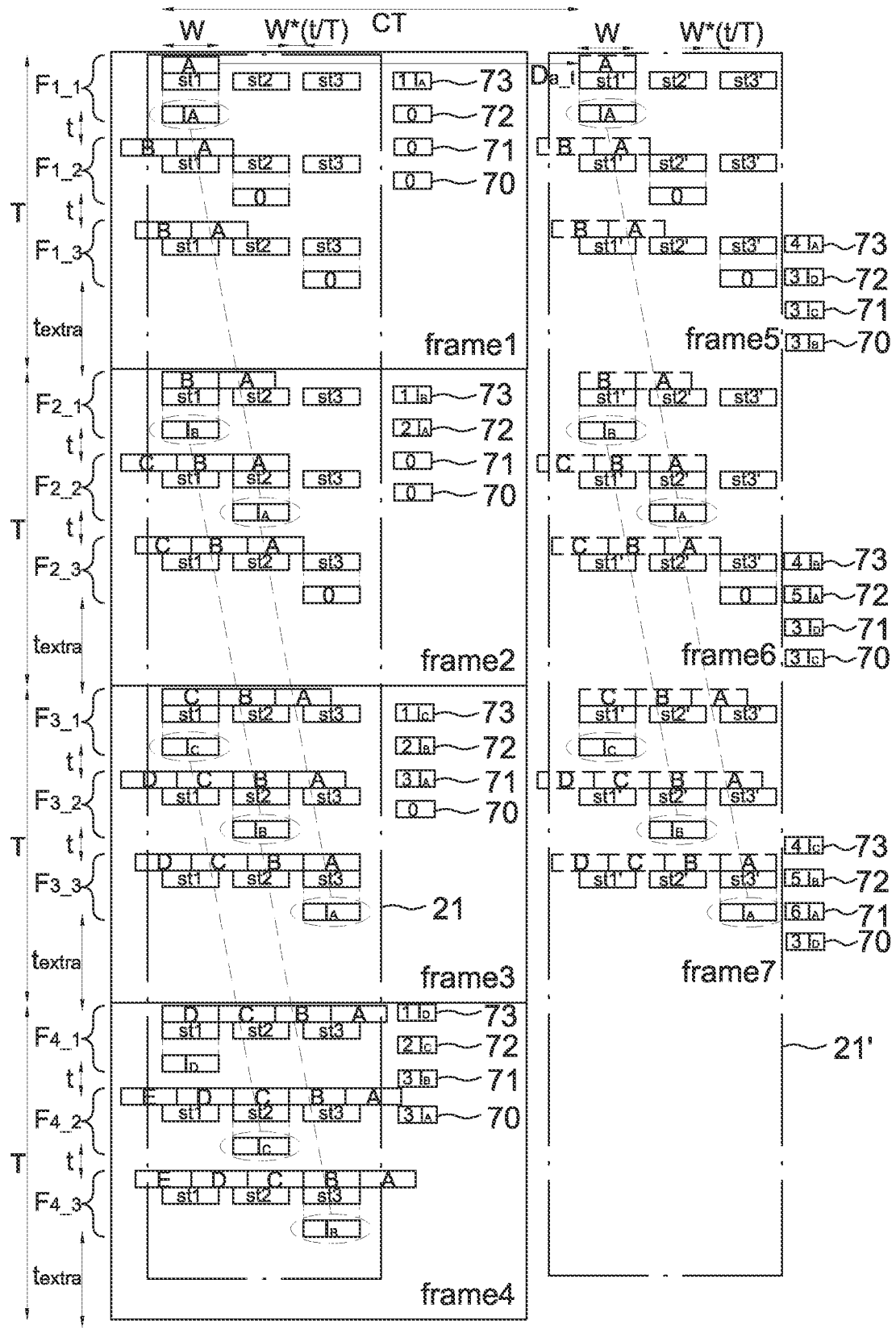
FIG. 11 is an operational schematic diagram of a TDI CMOS image sensor according to a third embodiment of the present disclosure.

It should be mentioned that although FIG. 10 shows that the separation spaces 2124 and 2124' are respectively a summation of a pixel height W in the along-track direction $D_{a\_t}$ and a multiplication of the pixel height W by a time ratio of a line time difference t of the rolling shutter and a frame period T of capturing an image frame (i.e. W*(1+t/T)), FIG. 10 is also adaptable to the embodiment that the separation spaces 2124 and 2124' are respectively a multiplication of a pixel height W in the along-track direction $D_{a\_t}$ by a time ratio of a line time difference t of the rolling shutter and a frame period T of capturing an image frame (i.e. W*(t/T)), as shown in FIG. 11.

FIG. 11 is an operational schematic diagram of the TDI CMOS image sensor 1000 according to a third embodiment of the present disclosure. In FIG. 11, frame1 to frame 4 indicate the operation of the first pixel array 21, and frame5 to frame7 indicate the operation of the second pixel array 21', wherein frame5 lags frame1 by a compensation time CT, frame6 lags frame2 by the compensation time CT, and so on.

As mentioned above, the image sensor 1000 further includes multiple integrators 230 (e.g., including 70 to 73 shown in FIG. 11, but not limited to) respectively used to integrate first pixel data, e.g., shown as $I_A$ to $I_D$, associated with the first pixel array 21 of the same position of a scene in adjacent image frames (e.g., frame1 to frame4). The operation of the first pixel array 21 causes the integrators 70, 71, 72 and 73 to be integrated with integrated pixel data $3I_A$, $3I_B$, $3I_C$ and $3I_D$, respectively. FIG. 11 also uses three rows of pixels (e.g., shown as st1 to st3, which are identical to Stage1 to Stage 3 in FIG. 7A, and st1' to st3') as an example for illustration.

After the compensation time CT, the integrators 70 to 73 continuously integrate second pixel data associated with the second pixel array 21' of the same position of the scene in adjacent image frames (e.g., frame5 to frame7), respectively. The operation of the second pixel array 21' is identical to that of the first pixel array 21 only data in the multiple integrators 230 is not from 0 (not being reset after operation of the first pixel array 21) but from integrated pixel data $3I_A$, $3I_B$, $3I_C$ and $3I_D$ acquired by the first pixel array 21.

Therefore, after the second pixel array 21' crosses the same position or object of the scene with that the first pixel array 21 crosses prior to the compensation time CT, the readout circuit 23 outputs integrated pixel data, e.g., $6I_A$, $6I_B$, $6I_C$ and $6I_D$ formed by integrating the first pixel data associated with the first pixel array 21 and the second pixel data associated with the second pixel array 21', thereby doubling a number of times of integrating pixel data.

As shown in FIG. 11, in an aspect of separation space=W*(t/T), each of the multiple integrators 230 sequentially integrates the first pixel data of adjacent image frames associated with the first pixel array 21 and the second pixel data of adjacent image frames associated with the second pixel array 21' to form the integrated pixel data.

However, in an aspect of separation space=W*(1+t/T), each of the multiple integrators 230 sequentially integrates pixel data of separated image frames, e.g. shown in FIG. 4A. That is, if the first pixel array 21 and the second pixel array 21' respectively have N rows of pixels, the multiple integrators 230 integrate the pixel data corresponding to the same position of a scene for N/2 times.

For example, each of the multiple integrators 230 integrates first pixel data in a first image frame and a second image frame associated with the first pixel array 21 corresponding to the same position of a scene, wherein the first image frame and the second image frame are separated by one image frame. Each of the multiple integrators 230 integrates second pixel data in a third image frame and a fourth image frame associated with the second pixel array 21' corresponding to the same position of the scene, wherein the third image frame and the fourth image frame are separated by one image frame. There is a compensation time Ct between the first image frame and the third image frame as well as between the second image frame and the fourth image frame.

Figure 12:
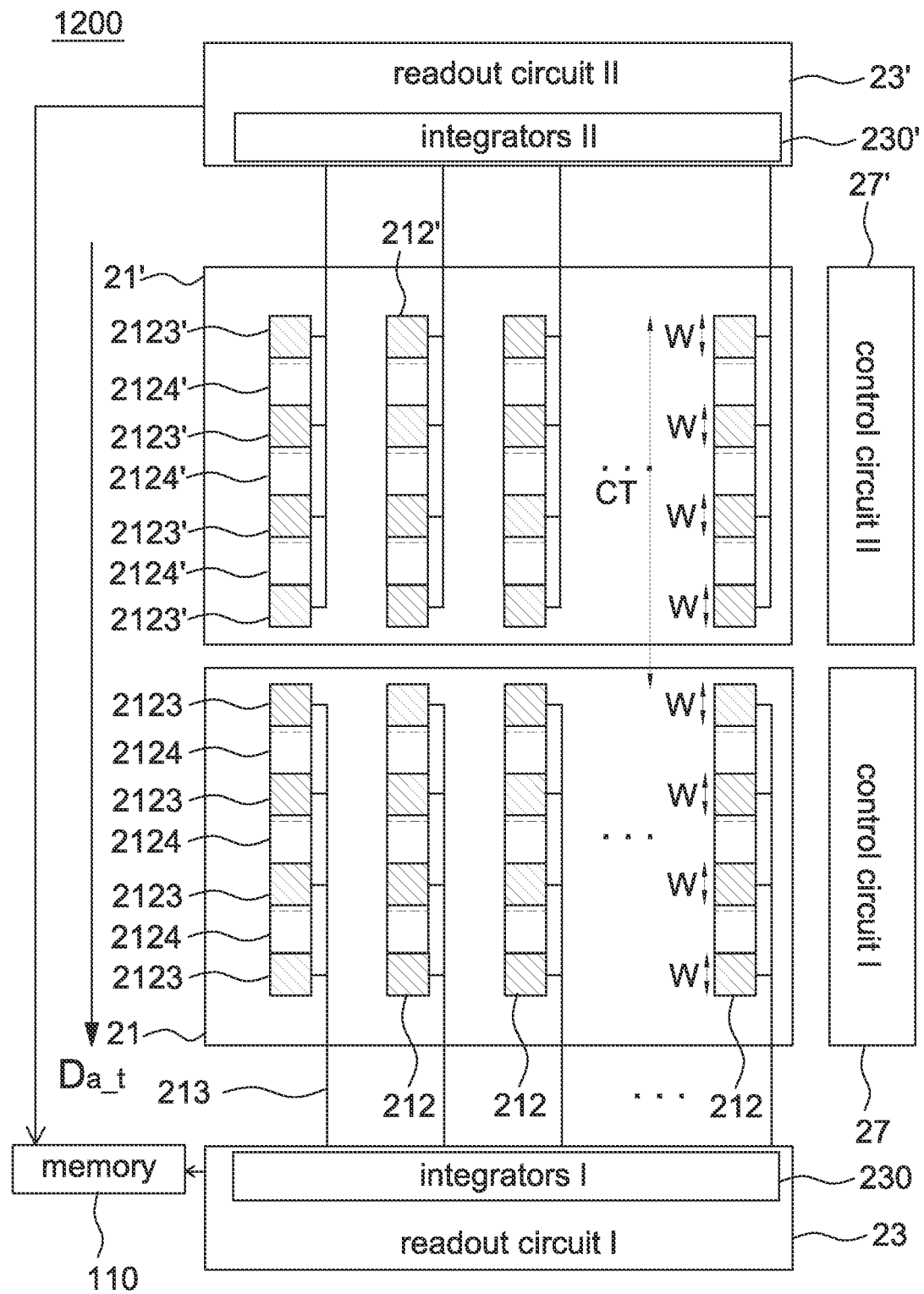
FIG. 12 is a schematic diagram of a TDI CMOS image sensor according to a fourth embodiment of the present disclosure.

Please refer to FIG. 12, it is a schematic diagram of a TDI CMOS image sensor 1200 according to a fourth embodiment of the present disclosure. The TDI CMOS image sensor 1200 includes a pixel array (or called a first pixel array hereinafter) 21, a control circuit 27 and a readout circuit (or called a first readout circuit hereinafter) 23, which are respectively identical to the pixel array 21, the control circuit 27 and the readout circuit 23 in FIG. 2.

Different from the TDI CMOS image sensor 200 in FIG. 2, the TDI CMOS image sensor 1200 in FIG. 12 further includes a second pixel array 21', a second control circuit 27' and a second readout circuit 23', wherein the second pixel array 21' also includes multiple pixel columns 212'. Each of the pixel columns 212' includes multiple pixels 2123' arranged in the along-track direction Da_t, and two adjacent pixels 2323' of each of the pixel columns 212' have a separation space 2124' therebetween.

The first readout circuit 23 reads first pixel data of the first pixel array 21 via readout lines 213, and the second readout circuit 23 reads second pixel data of the second pixel array 21' via readout lines 213', wherein the layout of the readout lines 213 and 213' is not limited to that shown in FIG. 12 as long as the first readout circuit 23 and the second readout circuit 23' are able to read the pixel arrays 21 and 21', respectively.

In the fourth embodiment, the first pixel array 21 and the second pixel array 21' are arranged along the along-track direction Da_t, and each of the pixel columns of the first pixel array 21 is aligned with a corresponding pixel column of the second pixel array 21' so as to sequentially cross the same position of a scene such that corresponding pixel data can be integrated meaningfully.

The first control circuit 27 controls operation timing of the first pixel array 21, and the second control circuit 27' controls operation timing of the second pixel array 21'. In one aspect, the first pixel array 21 and the second pixel array 21' operate simultaneously to output pixel data. For example, the first control circuit 27 controls the first pixel array 21 to output first pixel data with a rolling shutter from lower pixels to upper pixels 2123 in FIG. 12; and the second control circuit 27' concurrently controls the second pixel array 21' to output second pixel data with the rolling shutter from lower pixels to upper pixels 2123' in FIG. 12.

In one aspect, when the image sensor 1200 begins operation, the second control circuit 27' controls the second pixel array 21' to wait to operate after the first pixel array 21 begins operation plus the compensation time CT.

The main difference of the fourth embodiment from the third embodiment is that a single readout circuit 23 is used to read pixel data of the first pixel array 21 and the second pixel array 21' in the third embodiment, but two readout circuits 23 and 23' are respectively used to read pixel data of the first pixel array 21 and the second pixel array 21' in the fourth embodiment.

Figure 13:
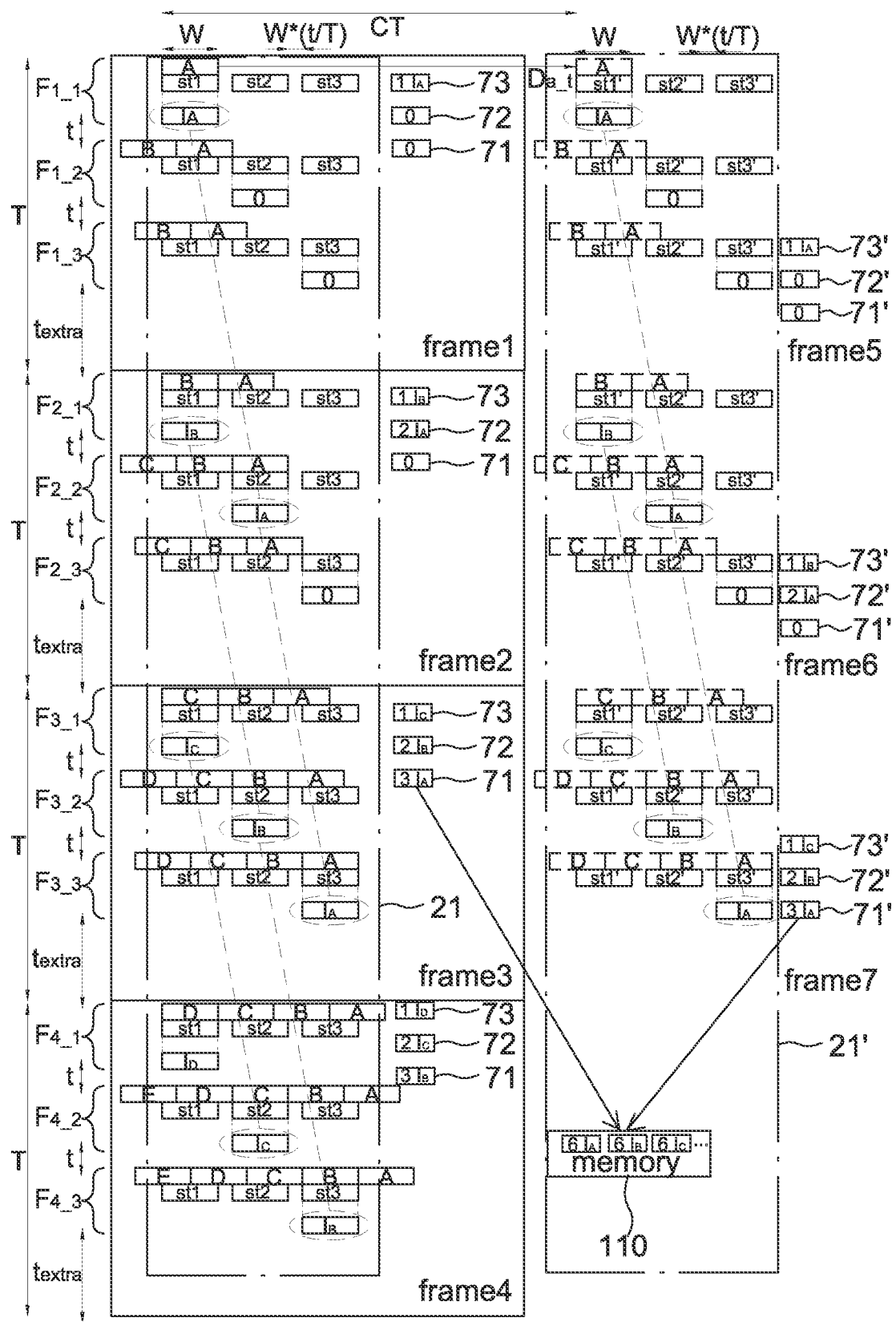
FIG. 13 is an operational schematic diagram of a TDI CMOS image sensor according to a fourth embodiment of the present disclosure.

Similarly, although FIG. 12 shows that the separation spaces 2124 and 2124' are respectively a summation of a pixel height W in the along-track direction Da_t and a multiplication of the pixel height W by a time ratio of a line time difference t of the rolling shutter and a frame period T of capturing an image frame (i.e. $W*(1+t/T)$), FIG. 12 is also adaptable to the embodiment that the separation spaces 2124 and 2124' are respectively a multiplication of a pixel height W in the along-track direction Da_t by a time ratio of a line time difference t of the rolling shutter and a frame period T of capturing an image frame (i.e. $W*(t/T)$), as shown in FIG. 13.

FIG. 13 is an operational schematic diagram of the TDI CMOS image sensor 1200 according to a fourth embodiment of the present disclosure. In FIG. 13, frame1 to frame 4 indicate the operation of the first pixel array 21, and frame5 to frame7 indicate the operation of the second pixel array 21, wherein frame5 lags frame1 by a compensation time CT, frame6 lags frame2 by the compensation time CT, and so on.

The image sensor 1200 includes multiple first integrators 230 (e.g., including 71 to 73 in FIG. 13, but not limited to) respectively used to integrate first pixel data, e.g., shown as $I_A$ to $I_D$, associated with the first pixel array 21 of the same position of a scene in adjacent image frames (e.g., frame1 to frame4). The image sensor 1200 further includes multiple second integrators 230' (e.g., including 71' to 73' in FIG. 13, but not limited to) respectively used to integrate second pixel data, e.g., $I_A$ to $I_D$, associated with the second pixel array 21' of the same position of the scene in adjacent image frames (e.g., frame5 to frame7).

In the fourth embodiment, the first readout circuit 23 outputs first integrated pixel data, e.g., $3I_A$, $3I_B$, $3I_C$ and $3I_D$, associated with the first pixel array 21, and the second readout circuit 23' outputs second integrated pixel data associated with the second pixel array 21', e.g., $3I_A$, $3I_B$ and $3I_C$, the first and second integrated pixel data corresponding to the same position or object of the scene. For simplification purposes, FIG. 13 shows only three frame periods frame5 to frame6 of the second pixel array 21'.

The image sensor 1200 further includes a memory 110 for integrating the first integrated pixel data associated with the first pixel array 21 and the second integrated pixel data associated with the second pixel array 21' to obtain $6I_A$, $6I_B$ and $6I_C$ to achieve the effect of doubling a number of times of integration.

The memory 110 is arranged outside of the first readout circuit 23 and the second readout circuit 23', or arranged within one of the first readout circuit 23 and the second readout circuit 23' without particular limitations. In one aspect, the memory 110 is a frame buffer, for firstly recording the first integrated pixel data outputted by the first pixel array 21 and then adding the second integrated pixel data outputted by the second pixel array 21' to the recorded first integrated pixel data, or vice versa. That is, the memory 110 does not output integrated pixel data until pixel data is integrated to a predetermined number of times (e.g., 6 times in FIG. 13, but not limited to).

As shown in FIG. 13, in an aspect of separation space=$W*(t/T)$, the multiple integrators 230 and 230' respectively integrate the first pixel data of adjacent image frames associated with the first pixel array 21 and the second pixel data of adjacent image frames associated with the second pixel array 21' to form first integrated pixel data (e.g., integrated in the integrators 71 to 73) and second integrated pixel data (e.g., integrated in the integrators 71' to 73').

However, in an aspect of separation space=$W*(1+t/T)$, multiple integrators 230 and 230' respectively integrate pixel data of separated image frames, as shown in FIG. 4A.

For example, multiple first integrators 230 (e.g. 71-73 in FIG. 13) are used to integrate first pixel data in a first image frame and a second image frame associated with the first pixel array 21 corresponding to the same position of a scene, wherein the first image frame and the second image frame are separated by one image frame; and multiple second integrators 230' (e.g. 71'-73' in FIG. 13) are used to integrate second pixel data in a third image frame and a fourth image frame associated with the second pixel array 21' corresponding to the same position of the scene, wherein the third image frame and the fourth image frame are separated by one image frame. There is a compensation time CT between the first image frame and the third image frame as well as between the second image frame and the fourth image frame. The compensation time CT is equal to a distance between pixels at corresponding positions in the first pixel array 21 and the second pixel array 21' divided by a moving speed of the image sensor 1200 (or the scene).

In the fourth embodiment, a first pixel in the first image frame for sensing the first pixel data of the same position of a scene and a second pixel in the second image frame for sensing the first pixel data of the same position of the scene are two adjacent pixels of a same pixel column in the first pixel array 21. Each of the first integrators 230 does not integrate the first pixel data of the same position of the first pixel and the second pixel in the frame period of the one image frame between the first image frame and the second image frame.

In the fourth embodiment, a third pixel in the third image frame for sensing the second pixel data of the same position of a scene and a fourth pixel in the fourth image frame for sensing the second pixel data of the same position of the scene are two adjacent pixels of a same pixel column in the second pixel array 21'. Each of the second integrator 230' does not integrate the second pixel data of the same position of the third pixel and the fourth pixel in the frame period of the one image frame between the third image frame and the fourth image frame.

More specifically, the first readout circuit 23 reads pixel data of the first image frame and the second image frame to be integrated in the multiple first integrators 230; and the second readout circuit 23' reads pixel data of the third image frame and the fourth image frame to be integrated in the multiple second integrators 230'. Finally, the image sensor 1200 adds the pixel data in the multiple integrators 230 and 230' corresponding to the same position of a scene (acquired with a time difference of a compensation time) to obtain doubled integrating times.

As mentioned above, the operation of the second pixel array 21' is identical to that of the first pixel array 21. The difference therebetween is that the second pixel data of the second pixel array 21' lags the first pixel data of the first pixel array 21 by one compensation time CT such that the second pixel data and the first pixel data are corresponding to the same position of the same scene.

Meanwhile, the image sensors 1000 in FIG. 10 and FIG. 11 are also adaptable to the TDI CMOS image sensor having different operation modes, as shown in FIG. 7A to FIG. 7C and FIG. 8A to FIG. 8C such that in one line time difference (e.g., FIGS. 7A and 8A), each of the integrators 230 is used to integrate pixel data in continuous image frames corresponding to the same position of a scene, referring to FIG. 11; whereas, in double line time difference (e.g., FIGS. 7B and 8B), each of the integrators 230 is used to integrate pixel data in non-continuous image frames corresponding to the same position of the scene.

Similarly, the image sensors 1200 in FIG. 12 and FIG. 13 are also adaptable to the TDI CMOS image sensor having different operation modes, as shown in FIG. 7A to FIG. 7C and FIG. 8A to FIG. 8C such that in one line time difference, each of the integrators 230 and 230' is used to integrate pixel data in continuous image frames corresponding to the same position of a scene, referring to FIG. 13; whereas, in double line time difference, each of the integrators 230 and 230' is used to integrate pixel data in non-continuous image frames corresponding to the same position of the scene. Accordingly, the TDI CMOS image sensors 1000 and 1200 are possible to be operated at different line time differences (t or 2t) at the fixed separation space, e.g. W*(t/T) or W*(y+t/T).

The operating methods of the first pixel array 21 and the second pixel array 21' of the image sensors 1000 and 1200 are respectively identical to those of the pixel array 21 in above embodiments of FIG. 2 to FIG. 4A and FIG. 7A to FIG. 8C, and thus more details thereof are described above. In a word, the image sensors 1000 and 1200 firstly add (using integrators or an additional memory) pixel data (with a time difference of compensation time CT) of the first pixel array 21 and the second pixel array 21', and then the added pixel data (e.g., $6I_A$, $6I_B$ and $6I_C$) is provided to a processor for post-processing.

It is appreciated that values, e.g., including a number of pixels, integrators, image frames and pixel arrays, in every embodiment and drawing of the present disclosure are only intended to illustrate but not to limit the present disclosure. In other words, the TDI CMOS image sensor of the present disclosure may use more than two pixel arrays. As long as the compensation time between different pixel arrays is previously known, it is possible to integrate pixel data corresponding to the same position of a scene acquired by different pixel arrays.

As mentioned above, when the CMOS image sensor adopting rolling shutter technique is applied to TDI imaging, the integrated pixel data is not exactly corresponding to the same position or object in a scene to generate distortion because the exposure of all pixels of a pixel array is not started and ended at the same time. Accordingly, the present disclosure further provides a TDI CMOS image sensor using a rolling shutter (e.g., FIGS. 2 and 5) and an operating method thereof (e.g., FIGS. 3, 4A and 6) that compensate the line time difference of a rolling shutter, which causes distortion, by arranging different pixel separation spaces. By arranging the control signal of a control circuit correspondingly, pixel data of corresponding position is integrated to the associated integrator correctly. Furthermore, by arranging multiple pixel arrays along an along-track direction and aligning every pixel column of the multiple pixel arrays to be able to cross the same position or object of a scene sequentially, pixel data of the aligned pixel columns can be integrated.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A time delay integration (TDI) complementary metal-oxide-semiconductor (CMOS) image sensor, configured to capture an image frame using a rolling shutter and move with respect to a scene in an along-track direction, the image sensor comprising:
a first pixel array and a second pixel array, each comprising multiple pixel columns, each of the pixel columns comprising multiple pixels arranged in the along-track direction, and two adjacent pixels of each of the pixel columns having a separation space therebetween, wherein the separation space is a multiplication of a pixel height in the along-track direction by a time ratio of a line time difference of the rolling shutter and a frame period of capturing the image frame,
wherein the first pixel array and the second pixel array are arranged along the along-track direction, and each of the pixel columns of the first pixel array is aligned with a corresponding pixel column of the second pixel array configured to sequentially cross a same position of the scene.

2. The image sensor as claimed in claim 1, wherein the frame period is larger than a summation of row exposure times of exposing all pixel rows of the first pixel array or the second pixel array using the rolling shutter.

3. The image sensor as claimed in claim 2, wherein in a time difference between the frame period and the summation of row exposure times, the image sensor enters a sleep mode.

4. The image sensor as claimed in claim 1, wherein the line time difference is a time interval between a time of starting exposure of two adjacent pixel rows of the first pixel array and the second pixel array.

5. The image sensor as claimed in claim 1, wherein the image sensor further comprises multiple integrators respectively configured to integrate first pixel data associated with the first pixel array and second pixel data associated with the second pixel array of the same position of the scene in adjacent image frames.

6. The image sensor as claimed in claim 5, wherein
there is a compensation time between acquiring the first pixel data associated with the first pixel array and acquiring the second pixel data associated with the second pixel array, and
the compensation time is equal to the frame period multiplied by a quotient obtained by dividing a distance between pixels at corresponding positions in the first pixel array and the second pixel array by the pixel height.

7. The image sensor as claimed in claim 5, further comprising:
a first readout circuit, configured to output first integrated pixel data associated with the first pixel array, and
a second readout circuit, configured to output second integrated pixel data associated with the second pixel array.

8. The image sensor as claimed in claim 7, further comprising:

a memory, configured to integrate the first integrated pixel data associated with the first pixel array and the second integrated pixel data associated with the second pixel array.

9. The image sensor as claimed in claim 5, further comprising:
a readout circuit, configured to output integrated pixel data of the first pixel data associated with the first pixel array and the second pixel data associated with the second pixel array.

10. The image sensor as claimed in claim 9, wherein each of the multiple integrators is configured to sequentially integrate the first pixel data associated with the first pixel array and the second pixel data associated with the second pixel array to form the integrated pixel data.

11. A TDI CMOS image sensor, configured to capture an image frame using a rolling shutter and move with respect to a scene in an along-track direction, the image sensor comprising:
a first pixel array and a second pixel array, each comprising multiple pixel columns, each of the pixel columns comprising multiple pixels arranged in the along-track direction, and two adjacent pixels of each of the pixel columns having a separation space therebetween, wherein the separation space is a summation of a pixel height in the along-track direction and a multiplication of the pixel height by a time ratio of a line time difference of the rolling shutter and a frame period of capturing the image frame,
wherein the first pixel array and the second pixel array are arranged along the along-track direction, and each of the pixel columns of the first pixel array is aligned with a corresponding pixel column of the second pixel array configured to sequentially cross a same position of the scene.

12. The image sensor as claimed in claim 11, further comprising:
a first integrator, configured to integrate first pixel data in a first image frame and a second image frame associated with the first pixel array corresponding to the same position of the scene, wherein the first image frame and the second image frame are separated by one image frame;
a second integrator, configured to integrate second pixel data in a third image frame and a fourth image frame associated with the second pixel array corresponding to the same position of the scene, wherein the third image frame and the fourth image frame are separated by one image frame,
wherein there is a compensation time between the first image frame and the third image frame as well as between the second image frame and the fourth image frame, and the compensation time is equal to a distance between pixels at corresponding positions in the first pixel array and the second pixel array divided by a moving speed of the image sensor.

13. The image sensor as claimed in claim 12, wherein
a first pixel in the first image frame for sensing the first pixel data of the same position and a second pixel in the second image frame for sensing the first pixel data of the same position are the two adjacent pixels of a same pixel column in the first pixel array,
a third pixel in the third image frame for sensing the second pixel data of the same position and a fourth pixel in the fourth image frame for sensing the second pixel data of the same position are two adjacent pixels of a same pixel column in the second pixel array 21', the first integrator is configured not to integrate the first pixel data of the same position sensed by the first pixel and the second pixel in the frame period of the one image frame between the first image frame and the second image frame, and
the second integrator is configured not to integrate the second pixel data of the same position sensed by the third pixel and the fourth pixel in the frame period of the one image frame between the third image frame and the fourth image frame.

14. The image sensor as claimed in claim 13, wherein each of the pixel columns comprises N pixels, and
the first integrator and the second integrator are configured to respectively integrate the first pixel data and the second pixel data corresponding to the same position of the scene for N/2 times.

15. The image sensor as claimed in claim 13, further comprising:
a first readout circuit, configured to read the first pixel data of the first image frame and the second image frame; and
a second readout circuit, configured to read the second pixel data of the third image frame and the fourth image frame.

16. The image sensor as claimed in claim 11, further comprising an integrator configured to
integrate first pixel data in a first image frame and a second image frame associated with the first pixel array corresponding to the same position of the scene, wherein the first image frame and the second image frame are separated by one image frame,
integrate second pixel data in a third image frame and a fourth image frame associated with the second pixel array corresponding to the same position of the scene, wherein the third image frame and the fourth image frame are separated by one image frame,
wherein there is a compensation time between the first image frame and the third image frame as well as between the second image frame and the fourth image frame, and the compensation time is equal to a distance between pixels at corresponding positions in the first pixel array and the second pixel array divided by a moving speed of the image sensor.

17. The image sensor as claimed in claim 11, wherein the line time difference is a time interval between a time of starting exposure of two adjacent pixel rows of the first pixel array and the second pixel array.

18. The image sensor as claimed in claim 11, further comprising buffers arranged within the separation space for amplifying a control signal of the pixel columns.

19. The image sensor as claimed in claim 11, wherein
the frame period is determined according to brightness of the scene and a sensitivity of the first pixel array or the second pixel array, and
a moving speed of the image sensor is equal to the pixel height divided by the frame period.

20. A TDI CMOS image sensor, configured to capture an image frame using a rolling shutter and move with respect to a scene in an along-track direction, the image sensor comprising:
a first pixel array and a second pixel array, each comprising multiple pixel columns, each of the pixel columns comprising multiple pixels arranged in the along-track direction, and two adjacent pixels of each of the pixel columns having a separation space therebetween, wherein the separation space is a multiplication of a pixel height in the along-track direction by a time ratio of a line time difference of the rolling shutter and a frame period of capturing the image frame; and multiple integrators, configured to respectively store pixel data in successive image frames corresponding to a same position of the scene, wherein in one line time difference, each of the integrators is configured to integrate the pixel data in continuous image frames corresponding to the same position of the scene, in double line time difference, each of the integrators is configured to integrate the pixel data in non-continuous image frames corresponding to the same position of the scene, and wherein the first pixel array and the second pixel array are arranged along the along-track direction, and each of the pixel columns of the first pixel array is aligned with a corresponding pixel column of the second pixel array configured to sequentially cross the same position of the scene.

* * * * *